United States Patent
Kondou et al.

(10) Patent No.: US 8,556,047 B2
(45) Date of Patent: Oct. 15, 2013

(54) AUTOMOBILE HYDRAULIC SHOCK ABSORBER

(75) Inventors: Katsuhiro Kondou, Shizuoka (JP); Masashi Maeda, Shizuoka (JP); Yutaka Yamazaki, Shizuoka (JP)

(73) Assignee: Yamaha Hatsudoki Kabushiki Kaisha, Shizuoka (JP)

(*) Notice: Subject to any disclaimer, the term of this patent is extended or adjusted under 35 U.S.C. 154(b) by 296 days.

(21) Appl. No.: 12/948,797

(22) Filed: Nov. 18, 2010

(65) Prior Publication Data

US 2011/0120822 A1    May 26, 2011

(30) Foreign Application Priority Data

Nov. 24, 2009  (JP) ................................ 2009-266813
Oct. 7, 2010   (JP) ................................ 2010-227670

(51) Int. Cl.
*F16F 9/00*    (2006.01)

(52) U.S. Cl.
USPC ............... 188/283; 188/321.11; 280/124.145; 280/124.147; 267/221; 267/177

(58) Field of Classification Search
USPC ............ 280/124.145, 124.147; 267/221–225
See application file for complete search history.

(56) References Cited

U.S. PATENT DOCUMENTS

| | | | | | |
|---|---|---|---|---|---|
| 4,618,127 | A | * | 10/1986 | Le Salver et al. | 267/220 |
| 4,651,977 | A | * | 3/1987 | Buma | 267/220 |
| 4,653,735 | A | * | 3/1987 | Buma | 267/220 |
| 5,678,810 | A | * | 10/1997 | Summers et al. | 267/220 |
| 6,427,814 | B1 | * | 8/2002 | Miyamoto | 188/321.11 |
| 6,981,578 | B2 | * | 1/2006 | Leiphart et al. | 188/322.14 |
| 7,077,248 | B2 | * | 7/2006 | Handke et al. | 188/321.11 |
| 7,350,779 | B2 | * | 4/2008 | Tamura | 267/220 |
| 8,037,982 | B2 | * | 10/2011 | Satou et al. | 188/314 |
| 2003/0234147 | A1 | * | 12/2003 | Lun | 188/322.17 |
| 2006/0006030 | A1 | | 1/2006 | Satou et al. | |

FOREIGN PATENT DOCUMENTS

| | | |
|---|---|---|
| JP | 07-029341 U | 6/1995 |
| JP | 2001-193782 A | 7/2001 |
| WO | 2004/065817 A1 | 8/2004 |

\* cited by examiner

*Primary Examiner* — Thomas Irvin
(74) *Attorney, Agent, or Firm* — Keating & Bennett, LLP

(57) ABSTRACT

An automobile hydraulic shock absorber includes a cylinder body, a piston, an upper support, a piston rod, a volume adjustment mechanism, first and second communicating passages, and a pressure-applying mechanism. The piston rod is attached to the upper support via a rubber cushion. The volume adjustment mechanism includes a free piston. The first and second communicating passages communicate the first oil chamber and second oil chamber with each other in the cylinder body via a diaphragm. The pressure-applying mechanism is disposed outside the cylinder body, movement thereof is restricted by the upper support, and the pressure-applying mechanism pushes the piston rod downward.

9 Claims, 13 Drawing Sheets

AUTOMOBILE HYDRAULIC SHOCK ABSORBER

BACKGROUND OF THE INVENTION

1. Field of the Invention

The present invention relates to an automobile hydraulic shock absorber provided between the vehicle body and the wheels of an automobile.

2. Description of the Related Art

A conventional automobile hydraulic shock absorber is composed of a hydraulic cylinder, and a diaphragm or the like provided to the hydraulic cylinder to generate a damping force (see WO 2004/065817, for example). The hydraulic cylinder of the hydraulic shock absorber described in WO 2004/065817 is provided with a cylinder body, a piston, and a piston rod. The piston divided inside of the cylinder body into a first oil chamber at the bottom-end side, and second oil chamber at the top-end side. The piston is attached to the piston rod.

The bottom end portion of the cylinder body is attached to a vehicle wheel via a rubber cushion. The piston rod passes through the top end portion of the cylinder body to protrude above the cylinder body. The top end portion of the piston rod is attached via a rubber cushion to a shock absorber connecting portion attached to the vehicle body.

A communicating passage for communicating the first oil chamber and second oil chamber with each other is formed in the piston. A diaphragm is provided to the communicating passage so that a damping force is generated when operating oil flows in the communicating passage. In other words, a damping force is generated when the hydraulic shock absorber extends or retracts and operating oil flows through the communicating passage from one oil chamber to the other oil chamber.

In order for the hydraulic shock absorber to extend or retract, the change in volume of the first oil chamber must match the change in volume of the second oil chamber. However, since the piston rod is inserted into the second oil chamber, the change in volume of the second oil chamber is less than the change in volume of the first oil chamber. In the hydraulic shock absorber disclosed in WO 2004/065817, such a problem is overcome by providing a volume adjustment mechanism inside the cylinder body.

The volume adjustment mechanism has a structure whereby a free piston which forms a part of the wall of the first oil chamber is pushed by the pressure of a high-pressure gas. The free piston is inserted so as to be able to move inside the cylinder body. The first oil chamber is formed between the free piston and the piston attached to the piston rod. High-pressure gas is charged into the space between the free piston and the bottom end of the inside of the cylinder body. In other words, as the hydraulic shock absorber extends and retracts, the free piston moves so that the change in volume of the first oil chamber matches the change in volume of the second oil chamber.

In the hydraulic shock absorber thus provided with a volume adjustment mechanism, the pressure of high-pressure gas is continuously applied from the first oil chamber to the piston for dividing the first oil chamber from the second oil chamber. The pressure of the high-pressure gas is exerted on the entire area of a pressure-receiving surface composed of the bottom surface (surface facing the free piston) of the piston via the operating oil inside the first oil chamber. The pressure of the high-pressure gas is also transmitted from the first oil chamber to the operating oil inside the second oil chamber via the operating oil in the communicating passage of the piston. In other words, the pressure of the high-pressure gas acts on the pressure-receiving surface composed of the bottom surface of the piston, and the pressure-receiving surface composed of the top surface of the piston.

The pressure-receiving surface composed of the top surface of the piston has a surface area smaller than that of the pressure receiving surface composed of the bottom surface of the piston, by an amount equal to the cross-sectional area of the piston rod. The piston is therefore pushed by an oil pressure (pressure of the high-pressure gas) corresponding in size to the difference in surface area between the pressure-receiving surfaces, and the piston rod moves toward the top end portion of the cylinder body so as to push the piston rod out from the cylinder body. In the present specification, the force with which the piston rod is pushed due to the difference in surface area of the pressure-receiving surfaces is referred to as the gas reactive force.

When the piston rod is pushed out from the cylinder body in this manner, the hydraulic shock absorber extends, and the rubber cushion provided between the hydraulic shock absorber and the vehicle body, or between the hydraulic shock absorber and the vehicle wheel, undergoes elastic deformation and hardens. Small bumps on the road over which the vehicle wheel rolls during travel are insufficient to cause the piston of the hydraulic shock absorber to move in relation to the cylinder body, and shocks that occur in such cases cannot be dampened. Small shocks that occur when the vehicle wheel rolls over small bumps during travel must be dampened by the rubber cushion. However, when the rubber cushion hardens as described above, such small shocks are not dampened by the rubber cushion, and are transmitted to the vehicle body.

In order to overcome such problems, a compression coil spring is provided inside the cylinder body in the hydraulic shock absorber disclosed in WO 2004/065817. This compression coil spring is provided inside the cylinder body such that the piston rod passes through the compression coil spring, so that the piston is pushed toward the free piston. The length of the compression coil spring is such that the compression coil spring extends from the piston to the other end portion of the cylinder body when the piston is positioned in a normal zone.

In other words, the piston is pushed toward the free piston by the spring force of the compression coil spring, and the gas reactive force described above is thereby cancelled out.

Besides the conventional hydraulic shock absorber described in WO 2004/065817, a conventional hydraulic shock absorber in which a compression coil spring is provided inside the cylinder body is also described in Japanese Laid-open Patent Publication No. 2001-193782, for example.

The compression coil spring in the cylinder body as described in Japanese Laid-open Patent Publication No. 2001-193782 is provided in order to prevent the piston in the fully extended hydraulic cylinder from colliding with the top end portion of the cylinder body. The compression coil spring does not normally push on the piston, and pushes on the piston only when the hydraulic cylinder is markedly extended.

A space for accommodating the compression coil spring for cancelling out the gas reactive force is necessary inside the cylinder body disclosed in WO 2004/065817. The hydraulic shock absorber disclosed in WO 2004/065817 therefore has drawbacks in that the overall length thereof is increased by an amount commensurate with the required space.

The weight of the compression coil spring in the cylinder body also increases, since the compression coil spring must be formed so as to have a length greater than the gap between the piston positioned within the normal zone and the top end portion of the cylinder body.

Furthermore, the spring force of the compression coil spring and the gas reactive force for raising the piston vary depending on the stroke position of the piston. In other words, in the hydraulic shock absorber disclosed in WO 2004/065817, when the piston is extended from the normal zone, the spring force is increased and the gas reactive force is reduced by the increased stroke amount. The spring force is greater than the gas reactive force in this case.

Conversely, in a case in which the hydraulic shock absorber is retracted from the state in which the piston is in the normal zone, the spring force is reduced and the gas reactive force is increased by the increased stroke amount. The gas reactive force is greater than the spring force in this case. In other words, the hydraulic shock absorber disclosed in WO 2004/065817 must generate a predetermined damping force while being subject to the effects both of variation in the spring force and variation in the gas reactive force as described above. It is therefore difficult to set the damping force to the optimum value in this hydraulic shock absorber.

In the hydraulic shock absorber disclosed in Japanese Laid-open Patent Publication No. 2001-193782, the overall length is also increased by the accommodation of a compression coil spring inside the cylinder body, the same as in the hydraulic shock absorber described in WO 2004/065817.

In the hydraulic shock absorber disclosed in Japanese Laid-open Patent Publication No. 2001-193782, when the stroke amount is small, whether during retraction or extension, the gas reactive force cannot be cancelled out. Therefore, when a vehicle provided with this hydraulic shock absorber is traveling on a straight road or a gently curving road, shocks that occur when a vehicle wheel rolls over small bumps on the road surface are transmitted to the vehicle body via the hydraulic shock absorber and the rubber cushion, resulting in poor ride quality.

SUMMARY OF THE INVENTION

In order to overcome such problems, preferred embodiments of the present invention provide an automobile hydraulic shock absorber having a small overall length and light weight despite having a structure whereby the gas reactive force exerted on the piston can be always cancelled out, and whereby the damping force can easily be set to the optimum value.

An automobile hydraulic shock absorber according to a first preferred embodiment of the present invention includes a cylinder body, a piston, a shock absorber connecting portion, a piston rod, a volume adjustment mechanism, a communicating passage, and a pressure-applying mechanism. The cylinder body includes a first end portion as one end portion in an axial direction, and a second end portion as the other end portion in the axial direction. The first end portion of the cylinder body is connected to one of a vehicle body and a vehicle wheel. The piston divides the inside of the cylinder body into a first oil chamber on the first end portion side and a second oil chamber on the second end portion side. The shock absorber connecting portion is connected to the other of the vehicle body and the vehicle wheel. The piston rod passes through the second end portion of the cylinder body from the piston and protrudes to the outside of the cylinder body. The piston rod is attached to the shock absorber connecting portion via a damping member. The volume adjustment mechanism pushes on the operating oil using pressure of a high-pressure gas, thereby canceling out the excess and deficiency of the operating oil corresponding to the increase or decrease in volume of the piston rod during movement of the piston. The communicating passage communicates the first oil chamber and the second oil chamber via a diaphragm. The pressure-applying mechanism is disposed outside the cylinder body. Movement of the pressure-applying mechanism is restricted by the shock absorber connecting portion. The pressure-applying mechanism pushes the piston rod toward the first end portion of the cylinder body. Connection to the vehicle body or a vehicle wheel herein includes direct connection as well as indirect connection via another member.

The automobile hydraulic shock absorber according to a second preferred embodiment of the present invention is the automobile hydraulic shock absorber according to the first preferred embodiment, wherein the size of the pushing force of the pressure-applying mechanism is equal to a gas reactive force for pushing the piston toward the second end portion of the cylinder body with a strength corresponding to a difference in surface area between one pressure-receiving surface of the piston and another pressure-receiving surface thereof.

The automobile hydraulic shock absorber according to a third preferred embodiment of the present invention is the automobile hydraulic shock absorber according to the first preferred embodiment, wherein the size of the pushing force of the pressure-applying mechanism is smaller than a gas reactive force for pushing the piston toward the second end portion of the cylinder body with a strength corresponding to a difference in surface area between one pressure-receiving surface of the piston and another pressure-receiving surface thereof.

The automobile hydraulic shock absorber according to a fourth preferred embodiment of the present invention is the automobile hydraulic shock absorber according to the first preferred embodiment, wherein the size of the pushing force of the pressure-applying mechanism is larger than a gas reactive force for pushing the piston toward the second end portion of the cylinder body with a strength corresponding to the difference in surface area between one pressure-receiving surface of the piston and the other pressure-receiving surface thereof.

The automobile hydraulic shock absorber according to a fifth preferred embodiment of the present invention is the automobile hydraulic shock absorber according to any of the first through fourth preferred embodiments, wherein the first end portion of the cylinder body is connected to the vehicle wheel. The shock absorber connecting portion is connected to the vehicle body. The pressure-applying mechanism is preferably provided between the shock absorber connecting portion and the cylinder body.

The automobile hydraulic shock absorber according to a sixth preferred embodiment of the present invention is the automobile hydraulic shock absorber according to any of the first through fourth preferred embodiments, wherein the first end portion of the cylinder body is connected to the vehicle wheel. The shock absorber connecting portion is connected to the vehicle body. The pressure-applying mechanism is preferably located across from the cylinder body, with the shock absorber connecting portion in between.

The automobile hydraulic shock absorber according to a seventh preferred embodiment of the present invention is the automobile hydraulic shock absorber according to any of the first through sixth preferred embodiments, wherein the pressure-applying mechanism includes a spring member. The spring member is positioned on the same axis as the piston rod, and pushes the piston rod.

The automobile hydraulic shock absorber according to an eighth preferred embodiment of the present invention is the automobile hydraulic shock absorber according to the seventh preferred embodiment, further including a pushing force adjustment mechanism. The pushing force adjustment mechanism has a screw portion extending in a direction parallel or substantially parallel to the piston rod; and a support portion that is caused to move in the axial direction of the piston rod by rotation of the screw portion. One end portion of the spring member is supported by the shock absorber connecting portion via the pushing force adjustment mechanism.

The automobile hydraulic shock absorber according to a ninth preferred embodiment of the present invention is the automobile hydraulic shock absorber according to any of the first through sixth preferred embodiments, wherein the pressure-applying mechanism includes a pushing hydraulic cylinder and a hydraulic passage. The pushing hydraulic cylinder moves the piston rod in relation to the shock absorber connecting portion. The hydraulic passage communicates the inside of the pushing hydraulic cylinder and the first oil chamber inside the cylinder body. The pushing force of the pressure-applying mechanism is the oil pressure transmitted from the first oil chamber in the cylinder body to the pushing hydraulic cylinder via the hydraulic passage.

The automobile hydraulic shock absorber according to a tenth preferred embodiment of the present invention is the automobile hydraulic shock absorber according to the ninth preferred embodiment, wherein the pressure-applying mechanism includes a valve arranged to open and close the hydraulic passage and a non-return valve arranged to direct operating oil from inside the pushing hydraulic cylinder to the hydraulic passage.

According to various preferred embodiments of the present invention, the gas reactive force for pushing the piston toward the second end portion of the cylinder body, the size of the gas reactive force corresponding to the difference in surface area between one pressure-receiving surface of the piston and the other pressure-receiving surface thereof, is reduced by the pushing of the piston rod by the pressure-applying mechanism.

The pressure-applying mechanism is provided outside the cylinder body. The cylinder body can therefore be constructed so as to have the minimum length necessary to enable the movement stroke of the piston to be maintained. Consequently, the hydraulic shock absorber of various preferred embodiments of the present invention can be formed so as to have a shorter overall length than the hydraulic shock absorber described in WO 2004/065817.

The pressure-applying mechanism pushes the piston rod, which does not move significantly in relation to the shock absorber connecting portion. The pressure-applying mechanism can therefore be compactly formed. The hydraulic shock absorber of various preferred embodiments of the present invention can therefore be formed so as to have lighter weight than the hydraulic shock absorber described in WO 2004/065817.

The pressure-applying mechanism pushes the piston rod always with a constant pushing force without being affected by the stroke position of the piston. Therefore, only the gas reactive force varies when the hydraulic shock absorber extends or retracts. The damping force is therefore easier to set in the hydraulic shock absorber of preferred embodiments the present invention than in the hydraulic shock absorber described in WO 2004/065817.

As a result, through various preferred embodiments of the present invention, an automobile hydraulic shock absorber can be provided having a small overall length and light weight despite having a structure whereby the gas reactive force exerted on the piston can be always reduced, and whereby the damping force can easily be set to a suitable value.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 3A and 3B are views showing another preferred embodiment of the automobile hydraulic shock absorber, wherein FIG. 3A is a plan view showing the support bracket, and FIG. 3B is a sectional view showing the relevant portion, the cutoff position in FIG. 3B being the position indicated by line III-III in FIG. 3A.

FIGS. 6A and 6B are sectional views along line VI-VI in FIG. 5, wherein FIG. 6A shows a state in which the pushing force is generated, and FIG. 6B shows a state in which the pushing force is eliminated.

FIGS. 9A and 9B are enlarged sectional views showing the spherical plain bearing, wherein FIG. 9A shows a state in which the ball is pushed downward, and FIG. 9B shows a state in which the ball is pushed upward.

FIGS. 13A and 13B are enlarged sectional views showing the rubber cushion portion, wherein FIG. 13A shows a state in which the piston rod is pushed downward, and FIG. 13B shows the state that occurs the moment the vehicle wheel travels over a small bump on the road.

DETAILED DESCRIPTION OF THE PREFERRED EMBODIMENTS

First Preferred Embodiment

A first preferred embodiment of the automobile hydraulic shock absorber of the present invention will be described in detail according to FIG. 1.

Figure 1:
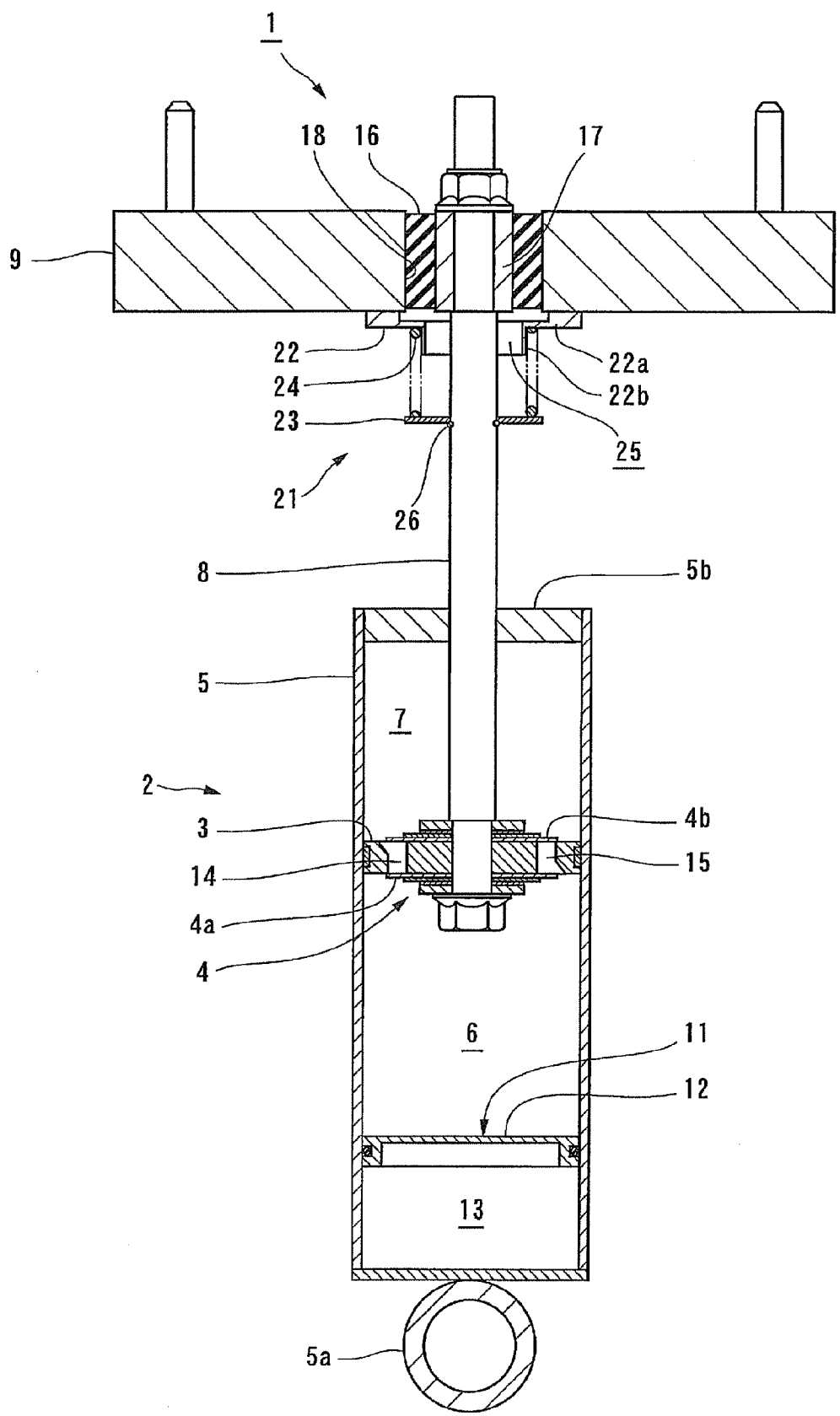
FIG. 1 is a sectional view showing the basic configuration of the automobile hydraulic shock absorber of a preferred embodiment according to the present invention.

The hydraulic shock absorber 1 shown in FIG. 1 is provided between the vehicle body and a wheel of an automobile. The hydraulic shock absorber 1 preferably includes a hydraulic cylinder 2, a diaphragm 4 provided to a piston 3 of the hydraulic cylinder 2, and other components.

The hydraulic cylinder 2 preferably includes a cylinder body 5, the piston 3, a piston rod 8, and other components. The bottom end portion of the cylinder body 5 is connected to the vehicle wheel. The piston 3 divides the inside of the cylinder body 5 into a first oil chamber 6 on the bottom end side and a second oil chamber 7 on the top end side. The piston rod 8 is connected to the piston 3. The inside of the first oil chamber 6 and the inside of the second oil chamber 7 are filed with operating oil. The hydraulic cylinder 2 according to the present preferred embodiment is inserted into a suspension spring (not shown) to support the weight of the vehicle body.

The suspension spring is provided between the external peripheral portion of the cylinder body 5 and an upper support 9 described hereinafter. The piston rod 8 is therefore not subjected to the weight of the vehicle body. The suspension spring may also be disposed beside and parallel or substantially parallel to the hydraulic cylinder 2.

An attachment member 5a arranged to attach the cylinder body 5 to the portion of a suspension device (not shown) that is attached to the vehicle wheel is provided at the bottom end of the cylinder body 5.

A volume adjustment mechanism 11 is provided inside the bottom end portion of the cylinder body 5. The volume adjustment mechanism 11 causes the change in volume of the first oil chamber 6 to match the change in volume of the second oil chamber 7.

The volume adjustment mechanism 11 according to the present preferred embodiment includes a free piston 12 and a high-pressure gas chamber 13. The free piston 12 defines a portion of the wall of the first oil chamber inside the cylinder body 5. The high-pressure gas chamber 13 is located below the free piston 12. High-pressure nitrogen gas is charged into the high-pressure gas chamber 13. In other words, the pressure of the high-pressure nitrogen gas is exerted on the operating oil inside the first and second oil chambers 6, 7.

The piston 3 separates the first oil chamber 6 from the second oil chamber 7. The piston 3 is fitted into the cylinder body 5 so as to be able to move. The bottom end portion of the piston rod 8 is fixed to a central axis portion of the piston 3. First and second communicating passages 14, 15 arranged to communicate the first oil chamber 6 and the second oil chamber 7 with each other via the diaphragm 4 are provided in the external peripheral portion of the piston 3.

The diaphragm 4 includes a first diaphragm 4a positioned on the bottom side of the piston 3, and a second diaphragm 4b positioned on the top side of the piston 3. The first and second diaphragms 4a, 4b are each formed preferably by stacking a plurality of leaf springs. The first diaphragm 4a opens and closes the opening of the first communicating passage 14 at the bottom end and generates a damping force when the piston 3 moves upward in relation to the cylinder body 5.

The second diaphragm 4b opens and closes the opening of the second communicating passage 15 at the top end and generates a damping force when the piston 3 moves downward in relation to the cylinder body 5.

The first and second communicating passages 14, 15 and the first and second diaphragms 4a, 4b are thus provided to the piston 3, and minute communicating passages not shown in the drawing are also preferably provided in addition to the communicating passages 14, 15. The pressure of the high-pressure nitrogen gas thereby passes through these communicating passages and diaphragms to pressurize the operating oil equally in the first and second oil chambers 6, 7. The surface area of a pressure-receiving surface composed of the bottom surface of the piston 3 is larger than the surface area of a pressure-receiving surface composed of the top surface of the piston 3 by an amount commensurate with the cross-sectional area of the piston rod 8. A gas reactive force is therefore exerted on the piston 3 so as to move the piston 3 toward the top end portion of the cylinder body 5.

The piston rod 8 passes through a lid member 5b of the top end portion of the cylinder body 5 and protrudes above the cylinder body 5. The top end portion of the piston rod 8 is attached to the upper support 9 via a rubber cushion 16. The upper support 9 is attached to a vehicle body frame member not shown in the drawing.

In the present preferred embodiment, the upper support 9 constitutes the "shock absorber connecting portion" of a preferred embodiment of the present invention, and the rubber cushion 16 constitutes the "damping member" of a preferred embodiment of the present invention. The rubber cushion 16 is fixed to the external peripheral surface of a cylinder 17 fixed to the top end portion of the piston rod 8, and a hole wall surface of a circular hole 18 of the upper support 9.

A pressure-applying mechanism 21 to cancel out the gas reactive force exerted on the piston 3 is provided between the upper support 9 and the cylinder body 5. The pressure-applying mechanism 21 is disposed below the upper support 9. In other words, the pressure-applying mechanism 21 is disposed on the same side of the upper support 9 as the cylinder body 5. The pressure-applying mechanism 21 preferably includes a support member 22, a pressure-receiving member 23, a compression coil spring 24, and other components. The support member 22 is fixed to the bottom surface of the upper support 9. The pressure-receiving member 23 is attached to the piston rod 8. The compression coil spring 24 is provided between the support member 22 and the pressure-receiving member 23. The compression coil spring 24 pushes the pressure-receiving member 23 downward with a predetermined spring force. In the present preferred embodiment, the compression coil spring 24 constitutes the "spring member" according to a preferred embodiment of the present invention.

The support member 22 preferably includes an annular portion 22a and a cylindrical portion 22b. The annular portion 22a is shaped so as to cover the rubber cushion 16 from below. The cylindrical portion 22b extends downward from the central axis portion of the annular portion 22a. The annular portion 22a is fixed to the bottom surface of the upper support 9, and upward movement thereof is thereby restricted.

The piston rod 8 is passed through the cylindrical portion 22b. A clearance 25 for allowing free movement of the piston rod 8 is provided between the piston rod 8 and the internal peripheral surface of the cylindrical portion 22b.

The pressure-receiving member 23 is preferably defined by a ring-shaped plate through which the piston rod 8 passes. The pressure-receiving member 23 is attached in a location of the piston rod 8 between the cylinder body 5 and the support member 22. Downward movement of the pressure-receiving member 23 is restricted by a circlip 26 attached to the piston rod 8.

The top end portion of the compression coil spring 24 is in contact with the annular portion 22a in a state of being fitted in the cylindrical portion 22b of the support member 22. The compression coil spring 24 is therefore positioned on the same axis as the piston rod 8. The bottom end of the compression coil spring 24 is in contact with the top surface of the pressure-receiving member 23.

The spring force of the compression coil spring 24 is equal in size to the gas reactive force which raises the piston 3, and is set so that the pressure-receiving member 23 is pushed downward. In other words, the pressure-applying mechanism 21 pushes the piston rod 8 toward the bottom end portion of the cylinder body 5 with a pushing force equal to the gas reactive force.

In the hydraulic shock absorber 1 thus configured, the cylinder body 5 ascends in relation to the piston rod 8 when the vehicle wheel ascends in relation to the vehicle body. At this time, a damping force is generated by the passage of operating oil through the second diaphragm 4b of the piston 3. When the cylinder body 5 descends in relation to the piston rod 8, a damping force is generated by the passage of operating oil through the first diaphragm 4a of the piston 3.

An upward gas reactive force is exerted on the piston 3, and the size of the gas reactive force corresponds to the difference in surface area between the pressure-receiving surface composed of the bottom surface and the pressure-receiving surface composed of the top surface. However, this gas reactive force is cancelled out by the pressure-applying mechanism 21 pushing the piston rod 8 downward with the spring force of the compression coil spring 24.

At this time, since the size of the pushing force of the pressure-applying mechanism 21 is equal to the size of the gas reactive force, substantially all of the gas reactive force is eliminated by the pushing force of the pressure-applying mechanism 21. As a result, the rubber cushion 16 provided between the piston rod 8 and the upper support 9 is maintained in a natural state with almost no elastic deformation thereof, and easily undergoes elastic deformation when the vehicle wheel rolls over small bumps on the road surface.

Consequently, vehicle ride quality is enhanced by attaching the hydraulic shock absorber 1 according to the present preferred embodiment to a vehicle.

The pressure-applying mechanism 21 according to the present preferred embodiment is preferably provided on the outside of (above) the cylinder body 5. The cylinder body 5 can therefore be constructed so as to have the minimum length necessary to enable the movement stroke of the piston 3 to be maintained.

Consequently, the hydraulic shock absorber according to the present preferred embodiment can be constructed so as to have a shorter overall length than the hydraulic shock absorber described in WO 2004/065817. The cylinder body 5 in the hydraulic shock absorber 1 according to the present preferred embodiment can also be constructed so as to have a smaller diameter in comparison with the hydraulic shock absorber described in WO 2004/065817, in which the compression coil spring is accommodated inside the cylinder body 5.

The pressure-applying mechanism 21 according to the present preferred embodiment pushes the piston rod 8, which does not move significantly in relation to the upper support 9. The pressure-applying mechanism 21 can therefore be compact. The hydraulic shock absorber 1 according to the present preferred embodiment can therefore be realized using a smaller compression coil spring 24 and have lighter weight in comparison with the hydraulic shock absorber described in WO 2004/065817.

The pressure-applying mechanism 21 according to the present preferred embodiment pushes the piston rod 8 always with a constant pushing force without being affected by the stroke position of the piston 3. Therefore, only the gas reactive force varies when the hydraulic shock absorber 1 extends or retracts. The damping force is therefore easier to set in the hydraulic shock absorber 1 according to the present preferred embodiment than in the hydraulic shock absorber described in WO 2004/065817.

The pressure-applying mechanism 21 according to the present preferred embodiment is provided between the upper support 9 and the cylinder body 5. Therefore, according to the present preferred embodiment, the dead space formed between the upper support 9 and the cylinder body 5 can be utilized to accommodate the pressure-applying mechanism 21, a compact hydraulic shock absorber can be provided.

The pushing force of the pressure-applying mechanism 21 according to the present preferred embodiment is the spring force of the compression coil spring 24 positioned on the same axis as the piston rod 8. Therefore, according to the present preferred embodiment, since the pressure-applying mechanism 21 can be realized using a simple structure, an even more compact hydraulic shock absorber can be provided. A diaphragm spring, air spring, fluid spring, and/or other fluid spring or the like may also be used instead of the compression coil spring 24 as the source to generate the pushing force of the pressure-applying mechanism 21.

The connection between the piston rod 8 and the pressure-receiving member 23 of the pressure-applying mechanism 21 can be formed by a screw extending in the axial direction of the piston rod 8. In this case, rotating the pressure-receiving member 23 causes the pressure-receiving member 23 to move in the axial direction of the piston rod 8. Through this configuration, the pushing force of the pressure-applying mechanism 21 (spring force of the compression coil spring 24) can easily be varied.

Rubber (not shown) may also be placed between the compression coil spring 24 of the pressure-applying mechanism 21 and the support member 22 or pressure-receiving member 23. Through this configuration, it is possible to even further reduce transmission of minute shocks from the road surface to the vehicle body.

Second Preferred Embodiment

Figure 2:
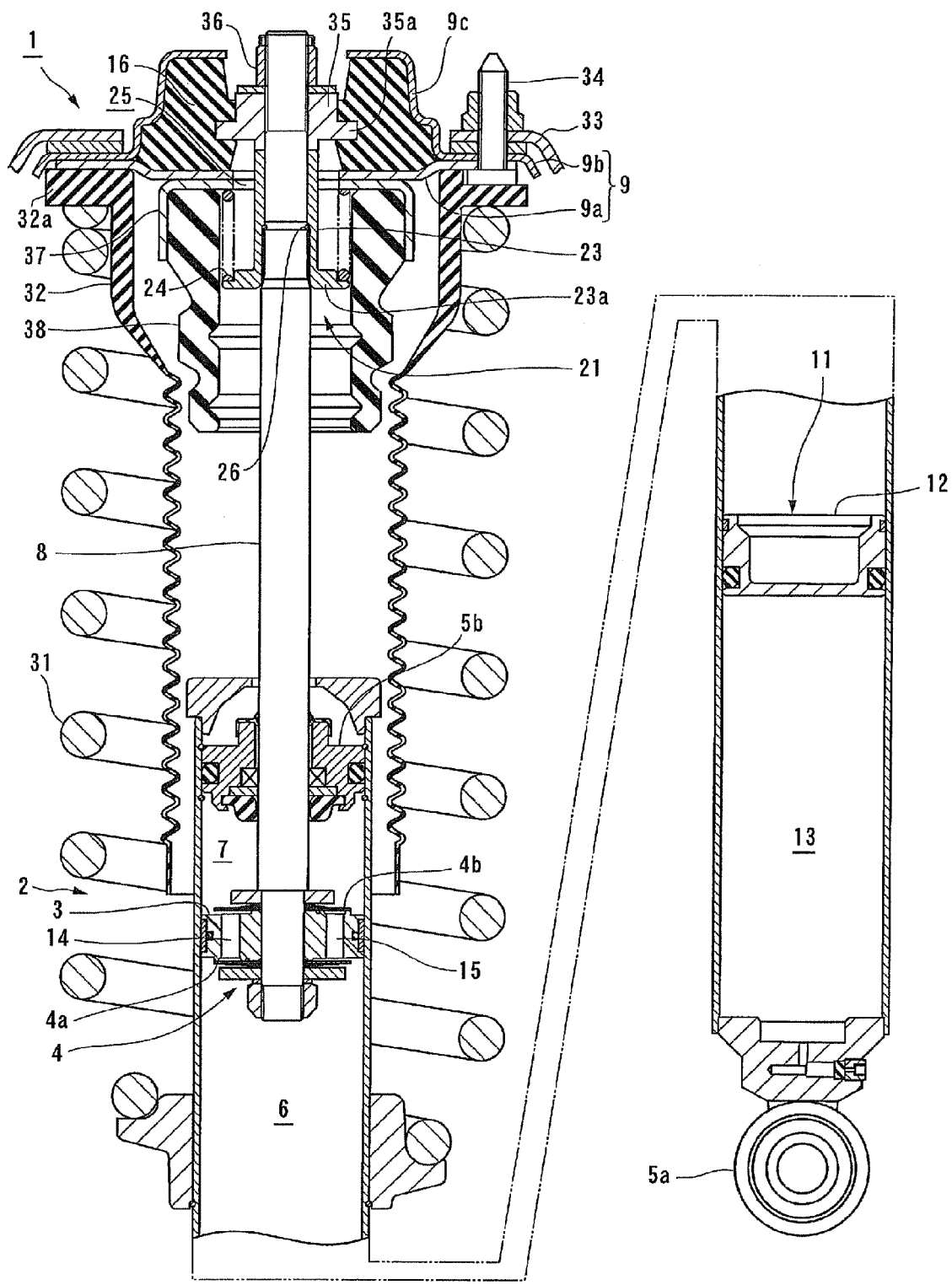
FIG. 2 is a sectional view showing the specific structure of the automobile hydraulic shock absorber of a preferred embodiment of the present invention.

The automobile hydraulic shock absorber according to a second preferred embodiment of the present invention can be formed as shown in FIG. 2. In FIG. 2, the same reference numerals are used to refer to members that are the same as or equivalent to those described in FIG. 1, and no detailed description of such members will be given.

The cylinder body 5 shown in FIG. 2 is inserted into a damping spring 31 to support the weight of the vehicle body. The damping spring 31 is provided between the cylinder body 5 and the upper support 9.

In the present preferred embodiment, an attachment flange 32a of a rubber cover 32 is held between the upper support 9 and the top end portion of the damping spring 31. The rubber cover 32 covers the top portion of the hydraulic cylinder 2.

The upper support 9 according to the present preferred embodiment preferably includes a lower plate 9a, and an upper plate 9b which is placed over the lower plate 9a. The upper support 9 is fixed to a frame member 33 of the vehicle body by a plurality of fixing bolts 34. A cylindrical portion 9c which protrudes upward is provided on the upper plate 9b. The space between the lower plate 9a and the inside of the cylindrical portion 9c is filled by a ring-shaped rubber cushion 16.

A flange 35a of a connecting member 35 is embedded into the center portion of the rubber cushion 16. The top portion of the piston rod 8 is fitted in the connecting member 35. The pressure-receiving member 23 of the pressure-applying mechanism 21 is fitted on the top portion of the piston rod 8. The pressure-receiving member 23 preferably has a cylindrical shape, and downward movement thereof is restricted by the circlip 26. The connecting member 35 and the pressure-receiving member 23 are brought into contact with each other and fastened together by a lock nut 36, and the piston rod 8 is thereby fixed to the connecting member 35.

A flange 23a arranged to support the bottom end portion of the compression coil spring 24 of the pressure-applying mechanism 21 is provided to the bottom end portion of the pressure-receiving member 23. The top end portion of the compression coil spring 24 is in contact with a support plate 37 which is welded to the bottom surface of the upper support 9. In other words, in the present preferred embodiment as well, the pressure-applying mechanism 21 pushes the piston rod 8 downward in a state in which upward movement of the pressure-applying mechanism 21 is restricted by the upper support 9.

The support plate 37 preferably has a bottomed cylindrical shape which opens downward. A rubber cylinder body 38 is fixed on the inside of the support plate 37. The cylinder body 38 prevents the top end portion of the cylinder body 5 from striking the pressure-applying mechanism 21. The cylinder body 38 surrounds the pressure-applying mechanism 21 from the outside, and is arranged so as to extend a predetermined length downward from the pressure-receiving member 23 of the pressure-applying mechanism 21.

Even when constructed as shown in FIG. 2, the hydraulic shock absorber 1 produces the same effects as the hydraulic shock absorber 1 shown in FIG. 1.

Rubber (not shown) may also be placed between the compression coil spring 24 of the pressure-applying mechanism 21 and the support plate 37 or pressure-receiving member 23. Through this configuration, it is possible to even further reduce transmission of minute shocks from the road surface to the vehicle body.

Third Preferred Embodiment

Figure 3A:
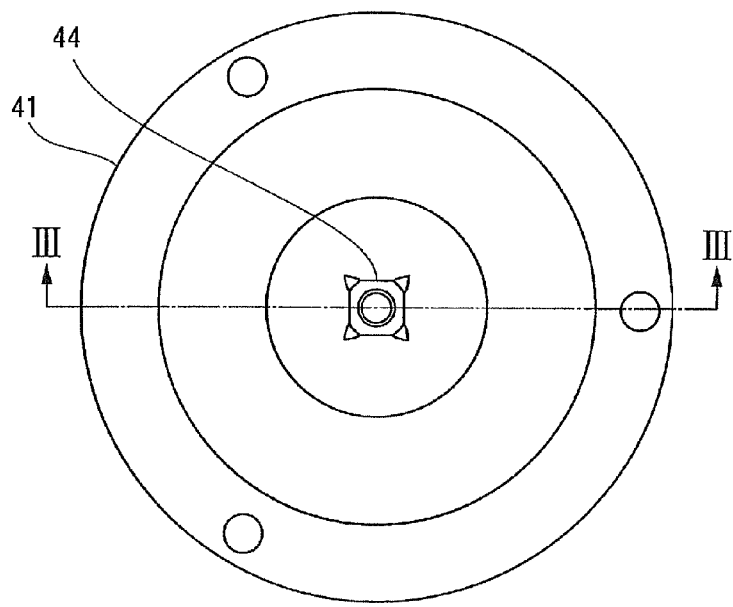
Figure 3B:
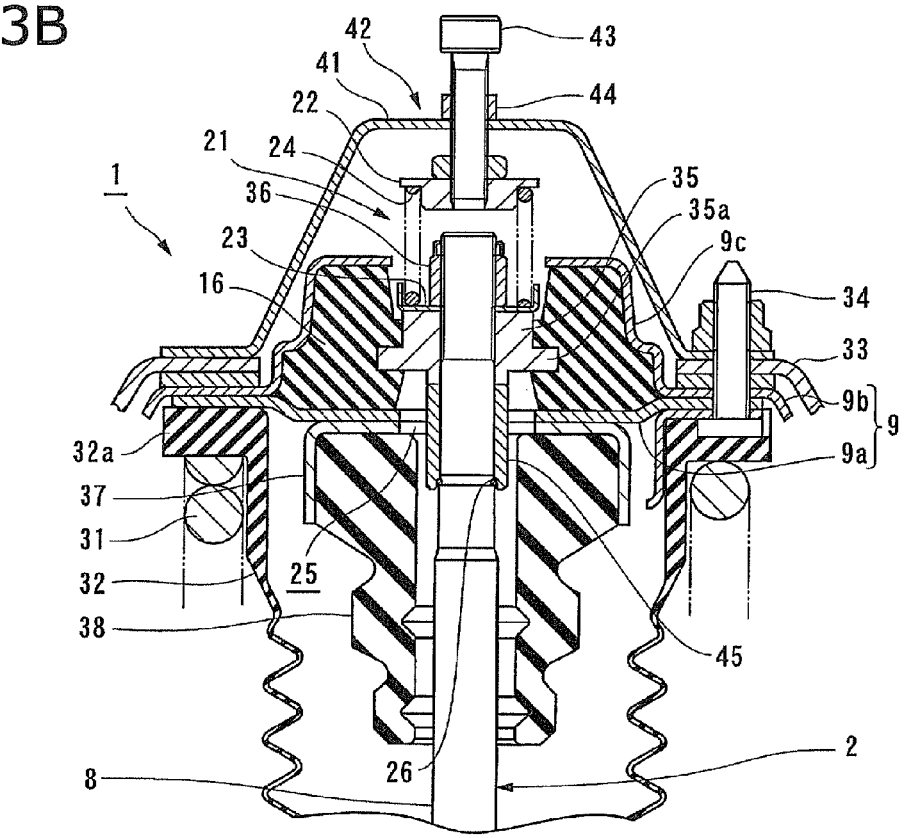

The pressure-applying mechanism can be configured as shown in FIGS. 3A and 3B. In FIGS. 3A and 3B, the same reference numerals are used to refer to members that are the same as or equivalent to those described in FIGS. 1 and 2, and no detailed description of such members will be given.

A supporting bracket 41 shaped so as to cover the top end portion of the piston rod 8 is attached to the upper support 9 shown in FIGS. 3A and 3B. The supporting bracket 41 preferably has a cup shape which opens downward. The supporting bracket 41 is fixed to the frame member 33 by a fixing bolt 34 together with the upper support 9 so as to cover the upper support 9 from above.

The pressure-applying mechanism 21 is attached to the supporting bracket 41 via a pushing force adjustment mechanism 42 described hereinafter. In other words, the pressure-applying mechanism 21 according to the present preferred embodiment is provided above the upper support 9 (on the opposite side of the shock absorber connecting portion (upper support 9) from the cylinder body 5).

The pushing force adjustment mechanism 42 includes an adjusting bolt 43 and a support member 22. The adjusting bolt 43 extends in a direction parallel or substantially parallel to the piston rod 8. The support member 22 is fixed to the bottom end portion of the adjusting bolt 43 and is disk-shaped. The adjusting bolt 43 is screwed into a nut 44 welded to the highest portion of the supporting bracket 41. The adjusting bolt 43 is attached in a position on the same axis as the piston rod 8, and is positioned so that the support member 22 is separated above the piston rod 8 by a predetermined interval.

Rotating the adjusting bolt 43 in relation to the supporting bracket 41 causes the support member 22 to move in the axial direction of the piston rod 8. In the present preferred embodiment, the adjusting bolt 43 constitutes the "screw portion" according to a preferred embodiment of the present invention, and the support member 22 constitutes the "support portion" according to a preferred embodiment of the present invention.

The pressure-applying mechanism 21 according to the present preferred embodiment has a support member 22, a pressure-receiving member 23, and a compression coil spring 24. The support member 22 is provided to the bottom end portion of the adjusting bolt 43. The pressure-receiving member 23 is disposed below the support member 22, and is connected to the piston rod 8. The compression coil spring 24 is provided between the support member 22 and the pressure-receiving member 23.

The pressure-receiving member 23 is fixed in between the connecting member 35 and the lock nut 36. The connecting member 35 is attached to the piston rod 8. The connecting member 35 is supported by a circlip 26 of the piston rod 8 via a spacer 45 so as to be unable to move downward in relation to the piston rod 8.

The compression coil spring 24 has a spring force capable of cancelling out the gas reactive force exerted on the piston 3.

In other words, in the present preferred embodiment as well, the pressure-applying mechanism 21 pushes the piston rod 8 downward in a state in which upward movement of the pressure-applying mechanism 21 is restricted by the upper support 9.

Even when constructed as shown in FIGS. 3A and 3B, the hydraulic shock absorber 1 produces the same effects as the hydraulic shock absorbers 1 shown in FIGS. 1 and 2.

In particular, since the pressure-applying mechanism 21 according to the present preferred embodiment is preferably provided above the upper support 9 (on the opposite side from the cylinder body 5), installation of the pressure-applying mechanism 21 on the piston rod 8 and operation of the adjusting bolt 43 are facilitated.

Moreover, in the present preferred embodiment, by tightening the adjusting bolt 43, the compression coil spring 24 is compressed, and the pushing force thereof increases. Loosening the adjusting bolt 43 causes the compression coil spring 24 to extend, and the pushing force thereof decreases.

Therefore, through the present preferred embodiment, a hydraulic shock absorber can be provided whereby the pushing force of the pressure-applying mechanism 21 can easily be varied.

Rubber (not shown) may also be placed between the compression coil spring 24 of the pressure-applying mechanism 21 and the support member 22 or pressure-receiving member 23. Through this configuration, it is possible to even further reduce transmission of minute shocks from the road surface to the vehicle body.

Fourth Preferred Embodiment

Figure 4:
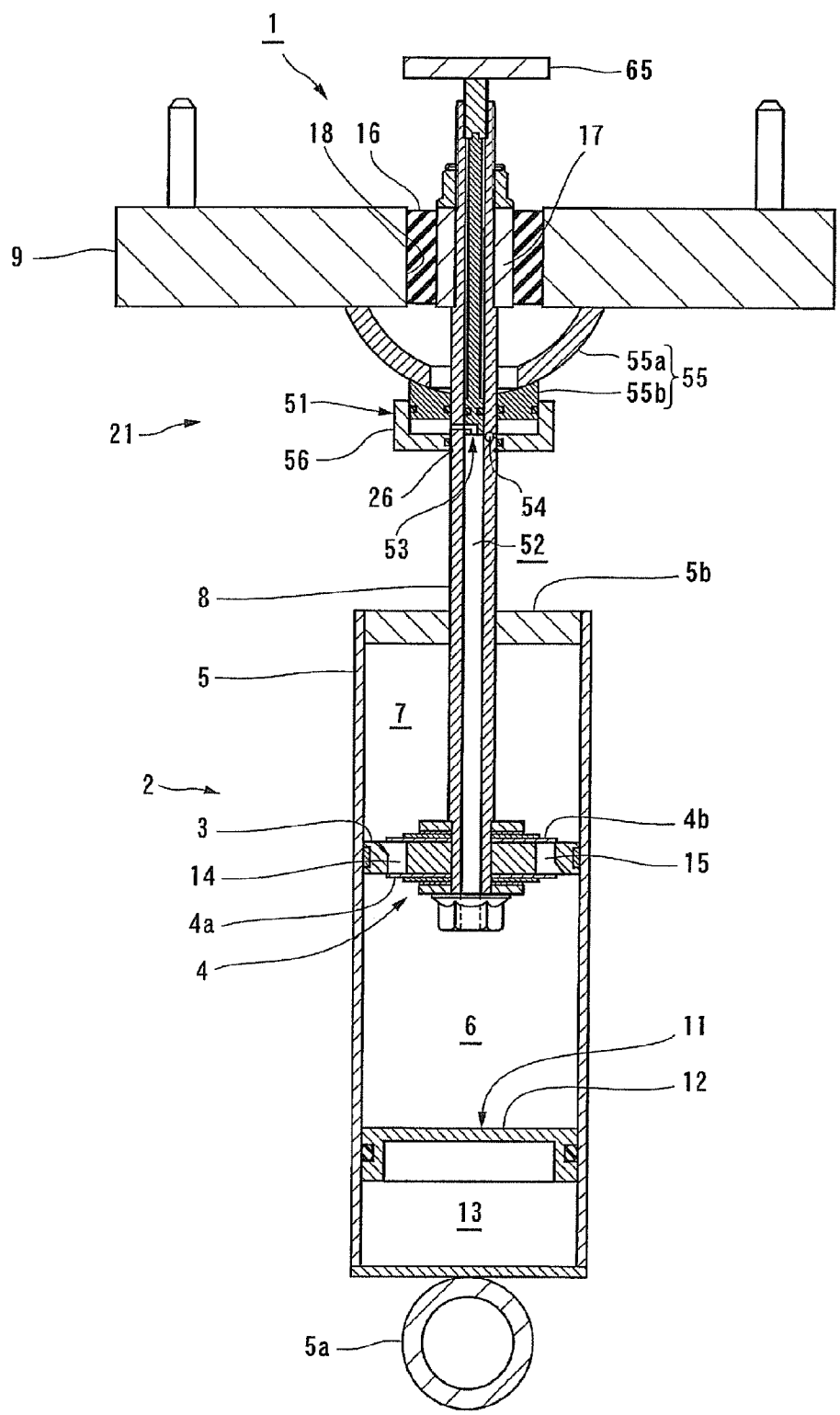
FIG. 4 is a sectional view showing another preferred embodiment of the automobile hydraulic shock absorber.
Figure 5:
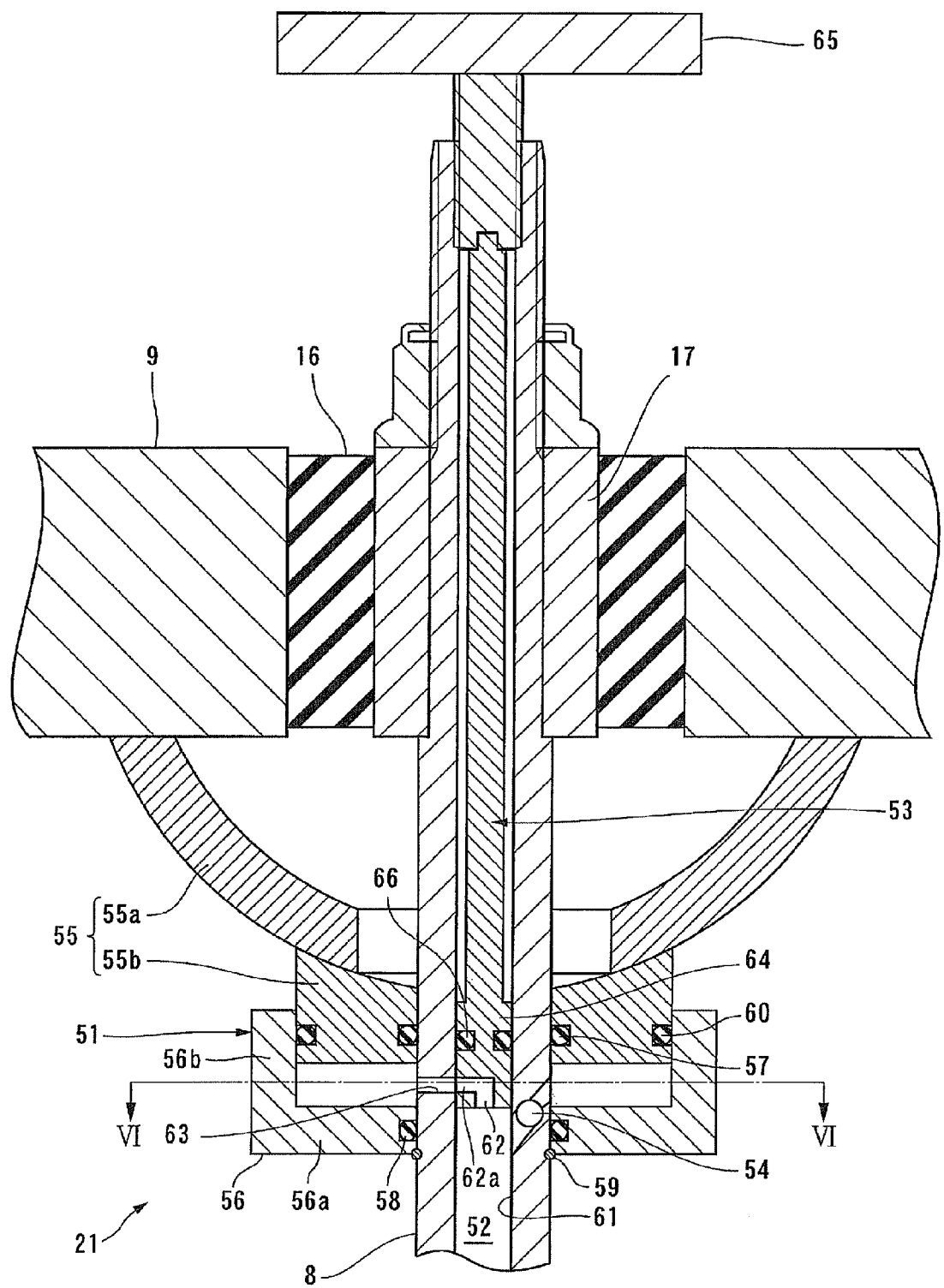
FIG. 5 is an enlarged sectional view showing the relevant portion.

The pressure-applying mechanism can be configured as shown in FIGS. 4 through 6. In FIGS. 4 through 6, the same reference numerals are used to refer to members that are the same as or equivalent to those described in FIGS. 1 through 3, and no detailed description of such members will be given.

The pressure-applying mechanism 21 shown in FIGS. 4 and 5 is provided with a pushing hydraulic cylinder 51, a hydraulic passage 52, a valve 53, and a non-return valve 54. The pushing hydraulic cylinder 51 moves the piston rod 8 in relation to the upper support 9. The hydraulic passage 52 communicates the inside of the pushing hydraulic cylinder 51 with the first oil chamber 6 inside the cylinder body 5. The valve 53 opens and closes the hydraulic passage 52. The non-return valve 54 directs operating oil to the hydraulic passage 52 from within the pushing hydraulic cylinder 51.

The pushing hydraulic cylinder 51 includes a piston portion 55 and a cylinder body portion 56. The piston portion 55 is attached to the bottom surface of the upper support 9. The cylinder body portion 56 is attached to the piston rod 8. The piston portion 55 has a support body 55a and a cylinder 55b, as shown in FIG. 5. The support body 55a protrudes downward from the bottom surface of the upper support 9, and has a substantially hemispherical shape. The cylinder 55b extends downward from the lowest portion of the support body 55a. The support body 55a is fixed to the upper support 9.

The spherical surface of the support body 55a is arranged so that the center in the vertical direction in the central axis portion of the cylindrical rubber cushion 16 is at the center of the support body 55a. The support body 55a is also not necessarily fixed to the upper support 9, and a clearance may be provided between the support body 55a and the upper support 9.

The top end portion of the cylinder 55b is shaped so as to slidably fit on the bottom surface (spherical surface) of the support body 55a. The piston rod 8 is slidably fitted into the cylinder 55b. An O-ring 57 is installed on the internal peripheral portion of the cylinder 55b to form a seal against the piston rod 8. In other words, when the piston rod 8 oscillates about the rubber cushion 16 in conjunction with upward and downward movement of the vehicle wheel, the cylinder 55b moves together with the piston rod 8 along the spherical surface of the support body 55a.

The cylinder body portion 56 includes a disk-shaped bottom wall 56a through which the piston rod 8 passes, and a cylindrical peripheral wall 56b which extends upward from the external peripheral portion of the bottom wall 56a. The bottom wall 56a is positioned on the same axis as the piston rod 8. An O-ring 58 for forming a seal against the piston rod 8 is installed in the bottom wall 56a. The bottom end portion of the bottom wall 56a is in contact with a circlip 59 attached to the piston rod 8. In other words, the cylinder body portion 56 is attached to the piston rod 8 so that downward movement of the cylinder body portion 56 is restricted.

The cylinder 55b of the piston portion 55 is fitted into the peripheral wall 56b so as to be able to move. An O-ring 60 for forming a seal against the peripheral wall 56b is installed on the external peripheral portion of the cylinder 55b.

The hydraulic passage 52 communicates the inside of the pushing hydraulic cylinder 51 with the first oil chamber 6. The hydraulic passage 52 has a through-hole 61, an oil hole 62 of the valve 53 described hereinafter, and a communicating hole 63. The through-hole 61 is provided in the central axis portion of the piston rod 8. The oil hole 62 of the valve 53 is provided inside the through-hole 61. The communicating hole 63 extends in the horizontal direction (a direction that is perpendicular or substantially perpendicular to the axial direction of the piston rod 8) through the inside of the piston rod 8 from the through-hole 61.

The valve 53 is provided inside the through-hole 61. The valve 53 includes a valve body 64 and a handle 65. The valve body 64 is inserted in the through-hole 61 so as to be able to rotate, and is rod shaped. The handle 65 is attached to the top end portion of the valve body 64. An O-ring 66 for forming a seal against the hole wall surface of the through-hole 61 is installed in the valve body 64. The oil hole 62 of the hydraulic passage 52 is formed in the bottom end portion of the valve body 64. The oil hole 62 extends upward from the bottom surface of the valve body 64, and then extends further in the horizontal direction.

A horizontally extending portion 62a of the oil hole 62 is located at the same height as the communicating hole 63 of the piston rod 8. The valve 53 is opened by connection of the horizontally extending portion 62a to the communicating hole 63, as shown in FIGS. 4 through 6A.

The handle 65 connected to the top end portion of the valve body 64 rotates the valve body 64 inside the through-hole 61. The handle 65 is screwed into the top end portion of the piston rod 8.

A mark is provided to the handle 65 so that the position of the horizontally extending portion 62a of the oil hole 62 (position at which the valve 53 is open) can be determined.

The non-return valve 54 is a so-called ball check valve, and is provided between the inside of the pushing hydraulic cylinder 51 and the through-hole 61 of the piston rod 8. The ball of the non-return valve 54 is retained so as to be able to move without dropping into the piston rod 8.

Figures 6A, 6B:
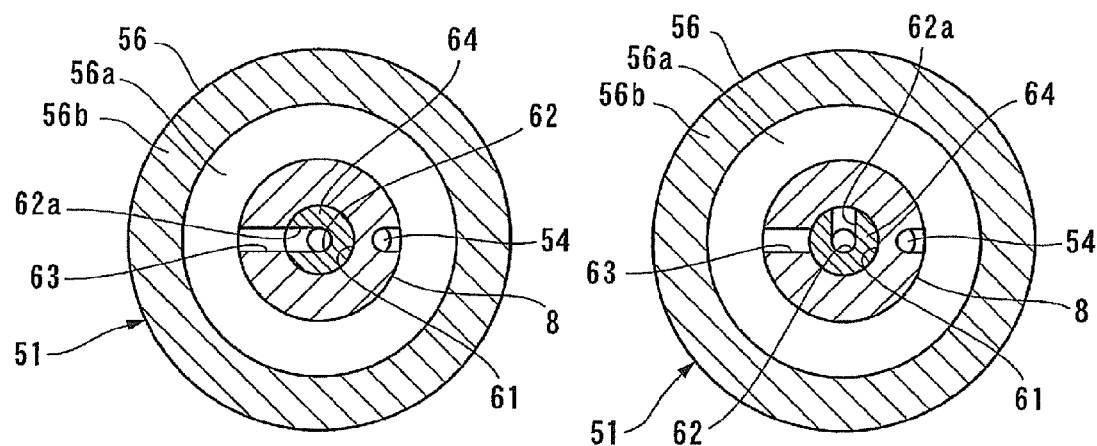

In the pressure-applying mechanism 21 according to the present preferred embodiment, the handle 65 attached to the top end portion of the piston rod 8 is operated to open the valve 53, and a pushing force is thereby generated. In order to open the valve 53, the handle 65 is rotated, and the horizontally extending portion 62a of the oil hole 62 described above is connected to the communicating hole 63 of the piston rod 8, as shown in FIG. 6A. By connection of the oil hole 62 to the communicating hole 63, the valve 53 opens, and the oil pressure inside the first oil chamber 6 is introduced into the pushing hydraulic cylinder 51 through the hydraulic passage 52.

When the oil pressure is introduced into the pushing hydraulic cylinder 51, the cylinder body portion 56 is pushed downward in relation to the piston portion 55 by the oil pressure. In a case in which the support body 55a of the piston portion 55 is not fixed to the upper support 9, the piston portion 55 is raised at this time by oil pressure and pushed against the upper support 9 from below.

The cylinder body portion 56 cannot move downward in relation to the piston rod 8. The piston rod 8 is therefore pushed downward at this time by the oil pressure inside the pushing hydraulic cylinder 51. In other words, the pushing force of the pressure-applying mechanism 21 is the oil pressure transmitted from the first oil chamber 6 inside the cylinder body 5 to the pushing hydraulic cylinder 51 via the hydraulic passage 52 inside the piston rod 8. In other words, in the present preferred embodiment as well, the pressure-applying mechanism 21 pushes the piston rod 8 downward in a state in which upward movement of the pressure-applying mechanism 21 is restricted by the upper support 9.

The size of the pushing force according to the present preferred embodiment is set equal to the gas reactive force for pushing the piston 3 upward. The size of the pushing force can be calculated based on the area of the pressure-receiving surfaces of the piston portion 55 and the cylinder body portion 56.

By returning or further rotating the handle 65 from the state in which the valve 53 is open, the oil hole 62 can no longer be connected to the communicating hole 63, and the valve 53 closes, as shown in FIG. 6B.

When the valve 53 closes, the supply of oil pressure to the pushing hydraulic cylinder 51 is stopped. At this time, the piston rod 8 is pushed upward by the gas reactive force. Therefore, after the valve 53 is closed, the cylinder body portion 56 is pushed upward by the gas reactive force, and the operating oil inside the pushing hydraulic cylinder 51 flows into the through-hole 61 through the non-return valve 54. The cylinder body portion 56 rises to the position at which the gas reactive force and the repulsive force of deformation of the rubber cushion 16 due to the gas reactive force are balanced.

The pushing force for cancelling out the gas reactive force is thus eliminated by closing of the valve 53. Even in such a state in which the gas reactive force and the repulsive force of the rubber cushion 16 are balanced, a clearance is maintained between the top end of the peripheral wall 56b of the cylinder body portion 56 and the bottom surface of the support body 55a of the piston portion 55. Small shocks that occur when the vehicle wheel rolls over small bumps on the road can therefore be at least somewhat dampened by the elasticity of the rubber cushion 16.

In the preferred embodiment shown in FIGS. 4 through 6B as well, since the pressure-applying mechanism 21 arranged to push the piston rod 8 downward is provided to the upper support 9, equivalent effects to those of the hydraulic shock absorber 1 shown in FIGS. 1 through 3 can be obtained.

As described above, the pushing force of the pressure-applying mechanism 21 according to the present preferred embodiment is the oil pressure transmitted to the pushing hydraulic cylinder 51 from the first oil chamber 6 inside the cylinder body 5 via the hydraulic passage 52 inside the piston rod 8. In other words, since the source for generating the pushing force is not a spring member, there is no damage due to metal fatigue. Consequently, the present preferred embodiment enables a hydraulic shock absorber to be provided that is highly reliable at cancelling out the gas reactive force.

In the hydraulic shock absorber 1 according to the present preferred embodiment, operating the handle 65 makes it possible to easily switch between a state in which pushing force is generated to cancel out the gas reactive force, and a state in which pushing force is not generated. The hydraulic shock absorber 1 can therefore be used with the valve 53 closed in a case in which the road surface is smooth, or in a case in which the driver prefers that shocks be transmitted from the vehicle wheel to the vehicle body.

Since the handle 65 is disposed above the upper support 9, the handle 65 can be easily operated without being blocked by the frame member 33, the hydraulic cylinder 2, or other components.

Fifth Preferred Embodiment

Figure 7:
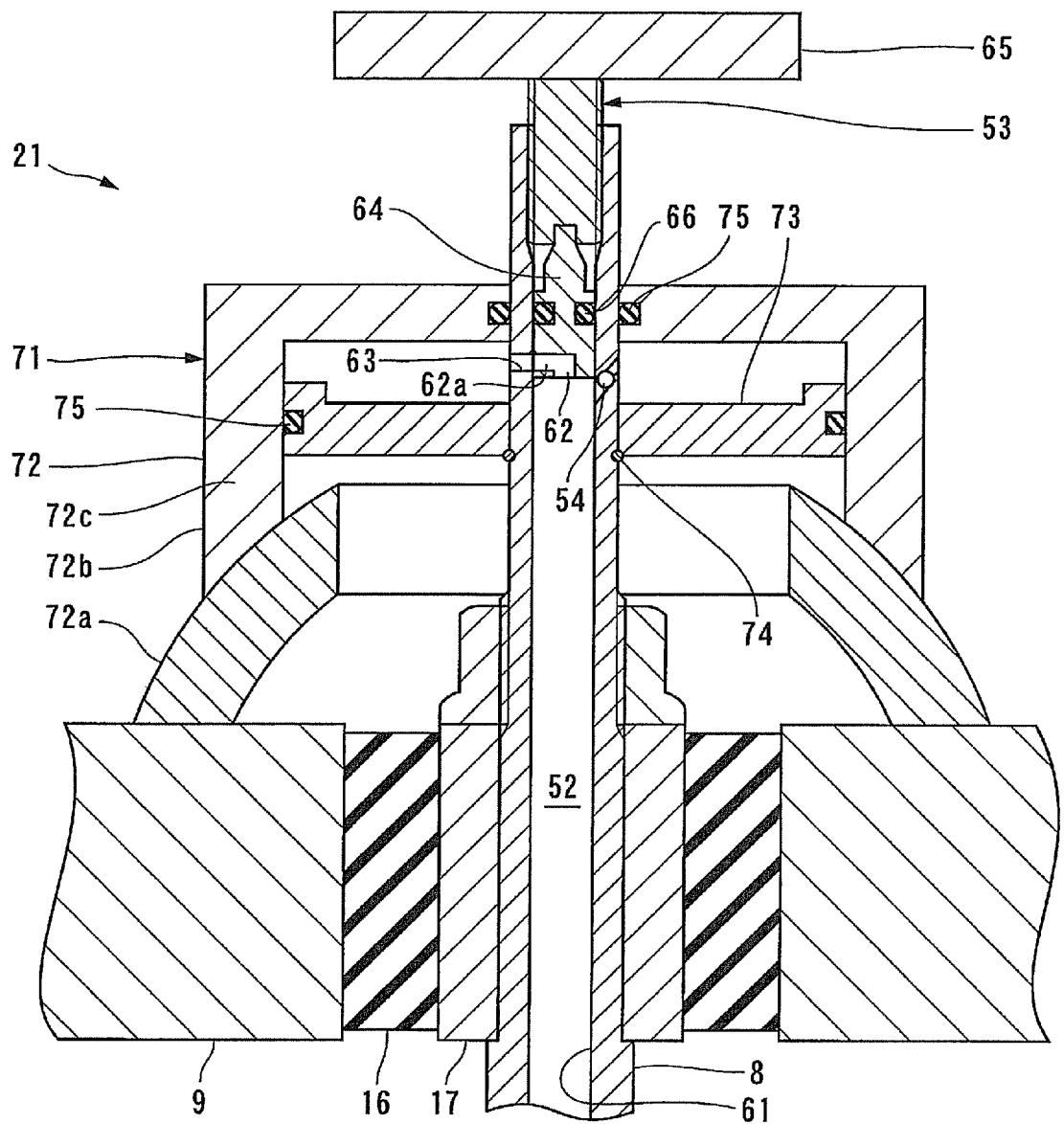
FIG. 7 is a sectional view showing another preferred embodiment of the automobile hydraulic shock absorber.

The pressure-applying mechanism can be configured as shown in FIG. 7. In FIG. 7, the same reference numerals are used to refer to members that are the same as or equivalent to those described in FIGS. 1 through 6, and no detailed description of such members will be given.

The pressure-applying mechanism 21 according to the present preferred embodiment is provided with a pushing hydraulic cylinder 71, and is provided on the opposite side (above) of the upper support 9 from the cylinder body 5. The pushing hydraulic cylinder 71 has a structure that utilizes the oil pressure of the first oil chamber 6 to move the piston rod 8 downward in relation to the upper support 9.

The pushing hydraulic cylinder 71 according to the present preferred embodiment includes a cylinder body portion 72 disposed above the upper support 9, and a piston portion 73 attached to the piston rod 8.

The cylinder body portion 72 includes a support body 72*a* attached on top of the upper support 9, and a movable portion 72*b* mounted on top of the support body 72*a*. The top surface of the support body 72*a* is defined by a spherical surface which is upwardly convex. The spherical surface of the support body 72*a* is arranged so that the center in the vertical direction in the central axis portion of the cylindrical rubber cushion 16 is at the center of the support body 72*a*.

The movable portion 72*b* is provided in a bottomed cylindrical shape which opens downward. The piston rod 8 passes through the central axis portion of the movable portion 72*b*.

The bottom surface of the movable portion 72*b* is shaped so as to slidably fit on the top surface (spherical surface) of the support body 72*a*. The movable portion 72*b* is configured so as not to separate upward from the support body 72*a* and to always be in contact with the abovementioned top surface even when the movable portion 72*b* is pushed upward by oil pressure. In other words, when the piston rod 8 oscillates about the rubber cushion 16 in conjunction with upward and downward movement of the vehicle wheel, the movable portion 72*b* moves together with the piston rod 8 along the spherical surface of the support body 72*a*.

The piston portion 73 is fitted inside a peripheral wall 72*c* of the movable portion 72*b* so as to be able to move. The piston portion 73 also makes contact with a circlip 74 from above, the circlip 74 being attached to the piston rod 8. An O-ring 75 arranged to prevent leakage of operating oil is installed between the cylinder body portion 72 and the piston portion 73.

In the present preferred embodiment as well, since the pressure-applying mechanism 21 arranged to push the piston rod 8 downward is provided to the upper support 9, equivalent effects to those of the hydraulic shock absorbers 1 shown in FIGS. 1 through 6 can be obtained.

Sixth Preferred Embodiment

Figure 8:
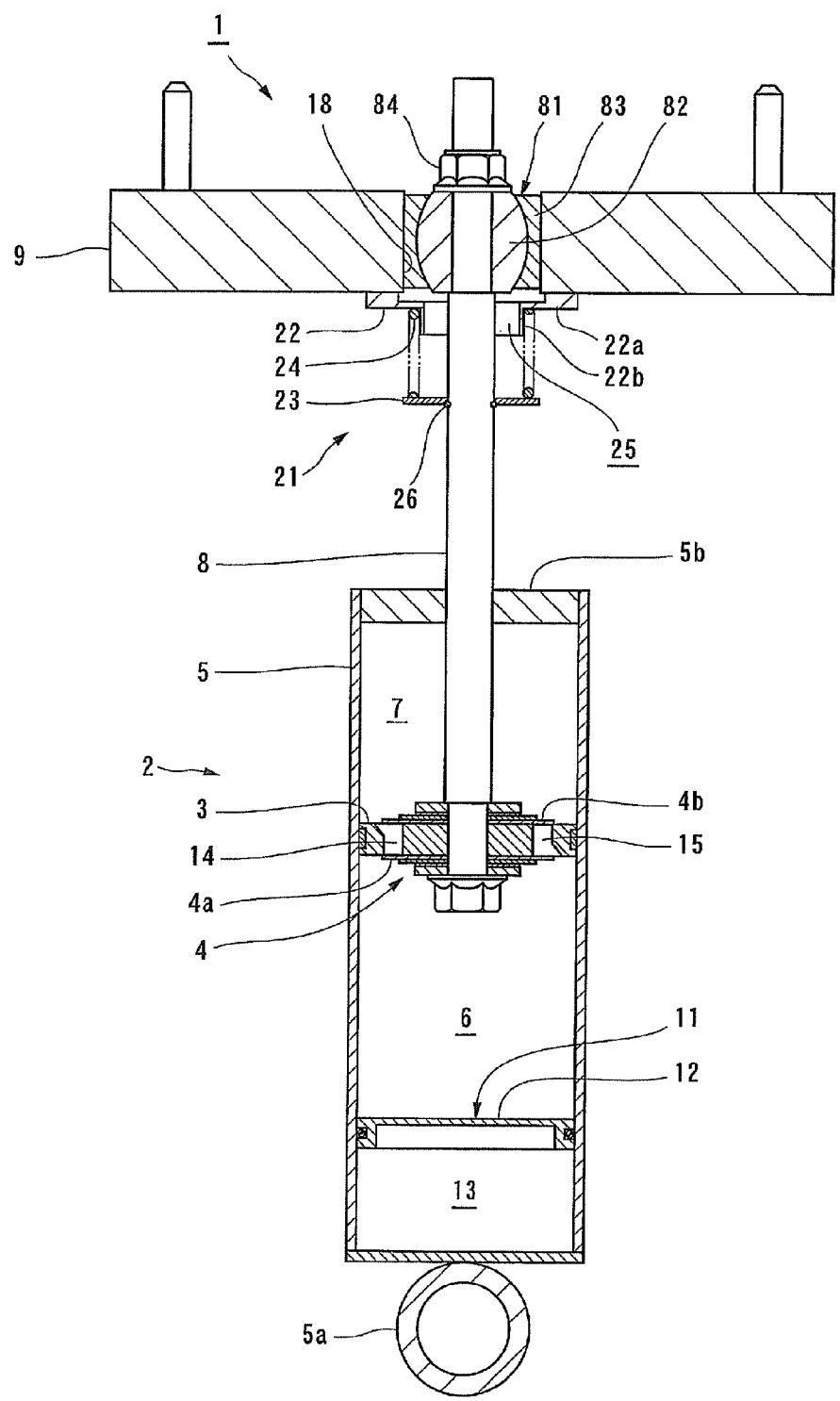
FIG. 8 is a sectional view showing another preferred embodiment of the automobile hydraulic shock absorber.
Figure 9A:
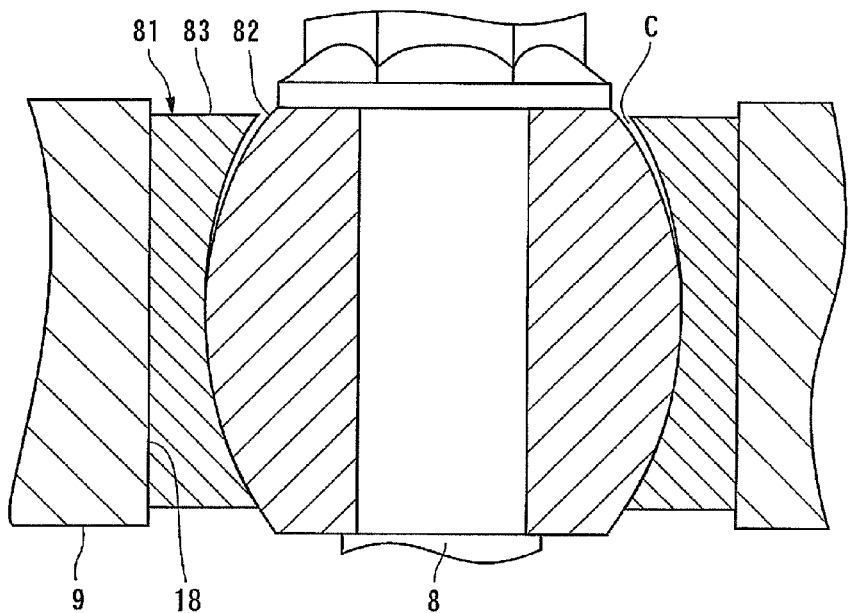
Figure 9B:
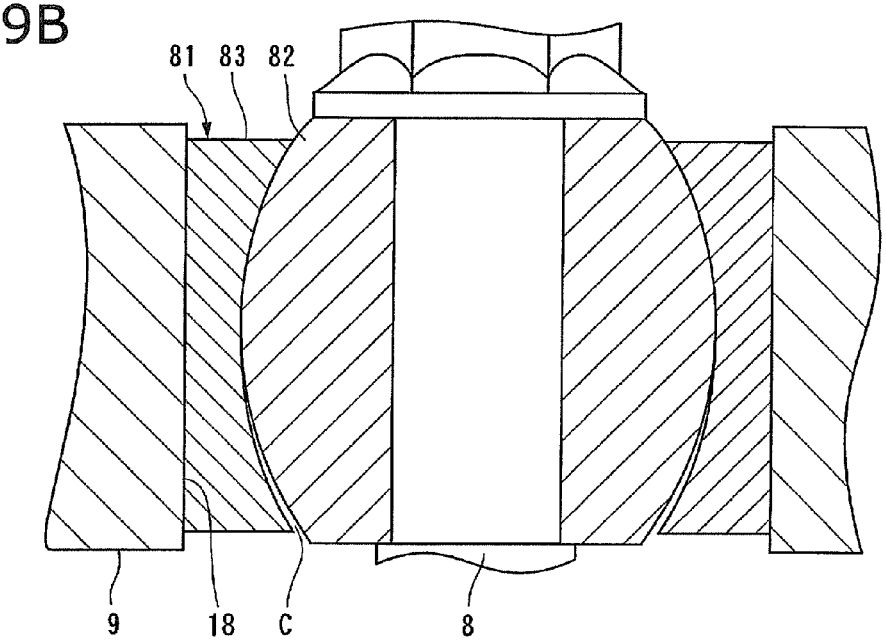

The hydraulic shock absorber according to a preferred embodiment of the present invention can be formed as shown in FIGS. 8, 9A and 9B. In FIGS. 8, 9A and 9B, the same reference numerals are used to refer to members that are the same as or equivalent to those described in FIG. 1, and no detailed description of such members will be given.

The piston rod 8 of the hydraulic shock absorber 1 according to the present preferred embodiment is attached to the upper support 9 via a spherical plain bearing (hereinafter referred to as a spherical joint) 81.

The spherical joint 81 has a ball 82 through which the piston rod 8 passes, and a holder 83 for movably supporting the outer surface of the ball 82.

The ball 82 is fixed to the top end portion of the piston rod 8 by a fixing nut 84. The holder 83 is fixed in the circular hole 18 of the upper support 9. In the present preferred embodiment, the spherical joint 81 constitutes the "damping member" according to a preferred embodiment of the present invention.

A clearance C is provided between the ball 82 and the holder 83 of the spherical joint 81, as shown in FIGS. 9A and 9B. FIG. 9A shows a state in which the ball 82 is moved downward from the holder 83 by an amount commensurate with the clearance C. FIG. 9B shows a state in which the ball 82 is moved upward from the holder 83 by an amount commensurate with the clearance C.

The pushing force of the pressure-applying mechanism 21 according to the present preferred embodiment is set so as to be larger than the gas reactive force urging the piston 3 upward. Through this configuration, the clearance C forms a gap between the holder 83 and the upper half of the ball 82 as shown in FIG. 9A, and the ball 82 is able to move upward in relation to the holder 83.

In the present preferred embodiment, shocks generated by the vehicle wheel rolling over small bumps on the road are dampened by the upward movement of the ball 82 in relation to the holder 83.

The hydraulic shock absorber 1 configured as described in the present preferred embodiment demonstrates equivalent effects to those of the hydraulic shock absorber 1 shown in FIG. 1.

Seventh Preferred Embodiment

Figure 10:
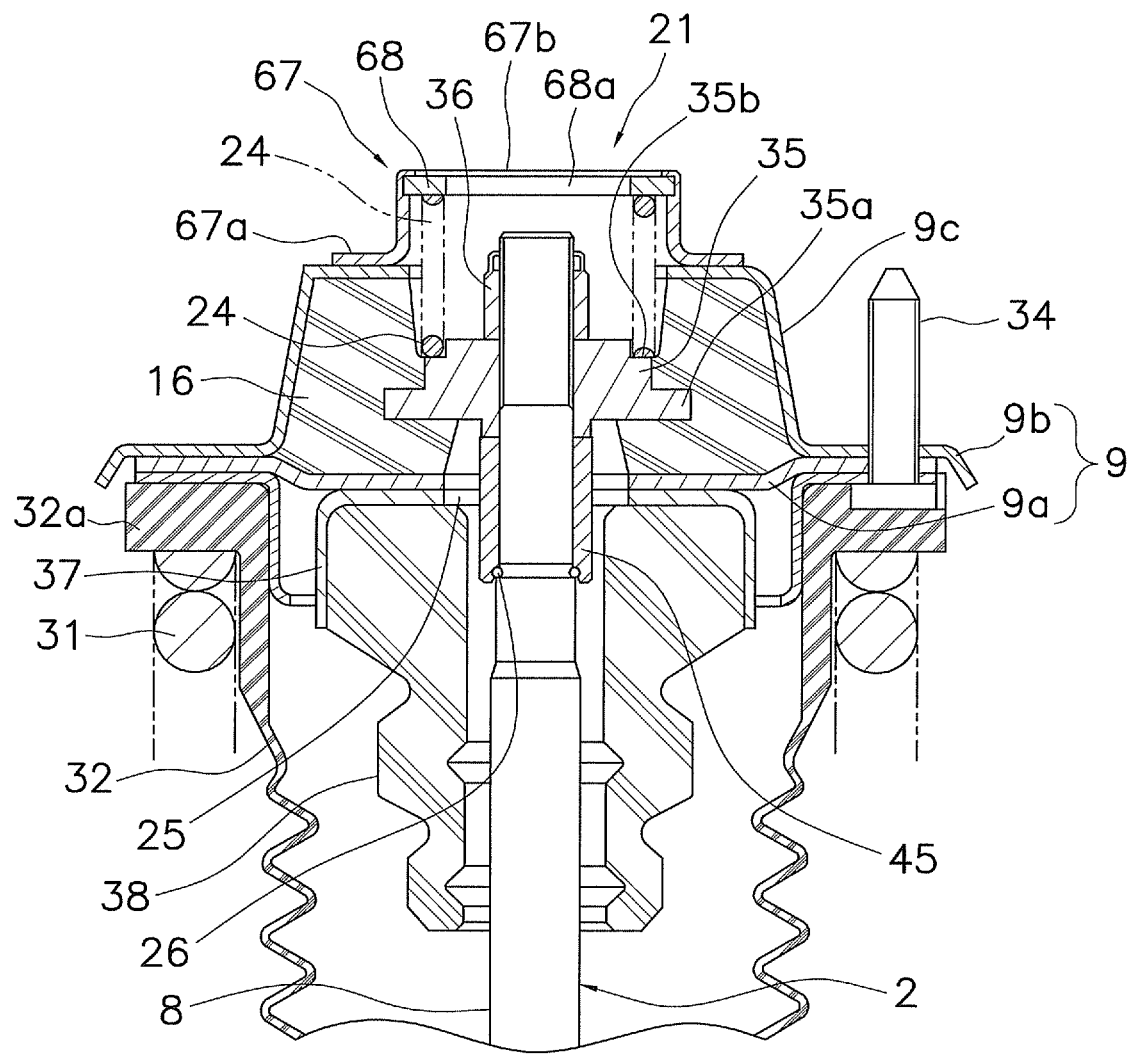
FIG. 10 is a sectional view showing another preferred embodiment of the automobile hydraulic shock absorber.

The pressure-applying mechanism can be configured as shown in FIG. 10. In FIG. 10, the same reference numerals are used to refer to members that are the same as or equivalent to those described in FIGS. 1 and 2, and no detailed description of such members will be given.

The pressure-applying mechanism 21 according to the present preferred embodiment is provided above the upper support 9 (on the opposite side of the shock absorber connecting portion (upper support 9) from the cylinder body 5).

The pressure-applying mechanism 21 includes a supporting bracket 67, a support member 68, and the compression coil spring 24. The supporting bracket 67 has a generally cylindrical shape, and has a flange portion 67a. The flange portion 67a is welded to the top surface of the cylindrical portion 9c of the upper plate 9b. The supporting bracket 67 is thereby fixed to the upper plate 9b. A hole 67b is also formed in the top surface of the supporting bracket 67. The hole 67b is disposed so as to face the top end portion of the piston rod 8. The support member 68 has an annular shape. The support member 68 is fitted in the hole 67b of the supporting bracket 67 and fixed to the supporting bracket 67. The support member 68 is fixed in the hole 67b of the supporting bracket 67 by crimping. The support member 68 has an annular shape. A hole 68a is formed in the support member 68. The hole 68a is disposed so as to face the top end portion of the piston rod 8.

The compression coil spring 24 is disposed between the connecting member 35 and the support member 68. Specifically, a step portion 35b is arranged along the peripheral direction in the top end of the connecting member 35. The bottom end portion of the compression coil spring 24 is in contact with the step portion 35b. The top end portion of the compression coil spring 24 is in contact with the bottom surface of the support member 68. The compression coil spring 24 is positioned on the same axis as the piston rod 8. The compression coil spring 24 has a spring force capable of cancelling out the gas reactive force exerted on the piston 3. In other words, in the present preferred embodiment as well, the pressure-applying mechanism 21 pushes the piston rod 8 downward in a state in which upward movement of the pressure-applying mechanism 21 is restricted by the upper support 9.

Even when formed as shown in FIG. 10, the hydraulic shock absorber 1 produces the same effects as the hydraulic shock absorber 1 shown in FIGS. 1 and 2. Since the pressure-applying mechanism 21 is provided above the upper support 9 (on the opposite side from the cylinder body 5) in the same manner as in the hydraulic shock absorber 1 shown in FIGS. 3A and 3B, the pressure-applying mechanism 21 can easily be installed on the piston rod 8.

Eighth Preferred Embodiment

Figure 11:
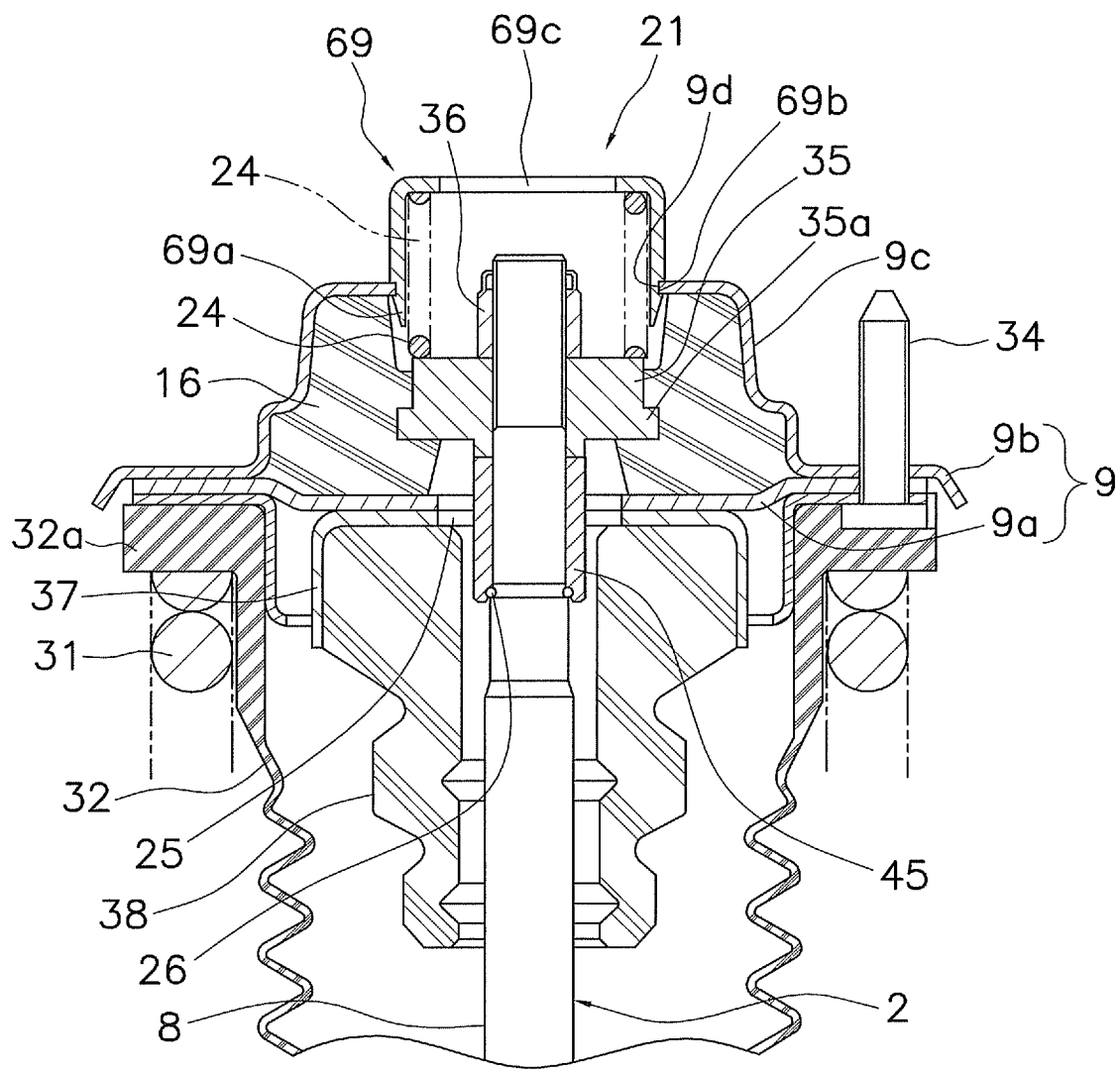
FIG. 11 is a sectional view showing another preferred embodiment of the automobile hydraulic shock absorber.

The pressure-applying mechanism can be configured as shown in FIG. 11. In FIG. 11, the same reference numerals are used to refer to members that are the same as or equivalent to those described in FIGS. 1 and 2, and no detailed description of such members will be given.

The pressure-applying mechanism 21 according to the present preferred embodiment is provided above the upper support 9 (on the opposite side of the shock absorber connecting portion (upper support 9) from the cylinder body 5). The pressure-applying mechanism 21 includes a supporting bracket 69 and the compression coil spring 24. The bottom end portion 69a of the supporting bracket 69 has a tapered shape such that the outside diameter of the supporting bracket 69 decreases toward the bottom. A groove 69b is also formed in the supporting bracket 69 along the peripheral direction thereof. The bottom end portion 69a of the supporting bracket 69 is inserted in a hole 9d in the top surface of the cylindrical portion 9c. The edge of the hole 9d of the cylindrical portion 9c is fitted into the groove 69b of the supporting bracket 69. The supporting bracket 69 is thereby fixed to the upper plate 9b. A hole 69c is also formed in the top surface portion of the supporting bracket 69. The hole 69c is disposed so as to face the top end portion of the piston rod 8.

The compression coil spring 24 is disposed between the connecting member 35 and the supporting bracket 69. Specifically, the bottom end portion of the compression coil spring 24 is in contact with the top surface of the connecting member 35. The top end portion of the compression coil spring 24 is in contact with the inside surface of the top surface portion of the supporting bracket 69. The compression coil spring 24 is positioned on the same axis as the piston rod 8. The compression coil spring 24 has a spring force capable of cancelling out the gas reactive force exerted on the piston 3. In other words, in the present preferred embodiment as well, the pressure-applying mechanism 21 pushes the piston rod 8 downward in a state in which upward movement of the pressure-applying mechanism 21 is restricted by the upper support 9.

Even when formed as shown in FIG. 11, the hydraulic shock absorber 1 produces the same effects as the hydraulic shock absorber 1 shown in FIGS. 1 and 2. Since the pressure-applying mechanism 21 is provided above the upper support 9 (on the opposite side from the cylinder body 5) in the same manner as in the hydraulic shock absorber 1 shown in FIGS. 3A and 3B, the pressure-applying mechanism 21 can easily be installed on the piston rod 8.

Ninth Preferred Embodiment

Figure 12:
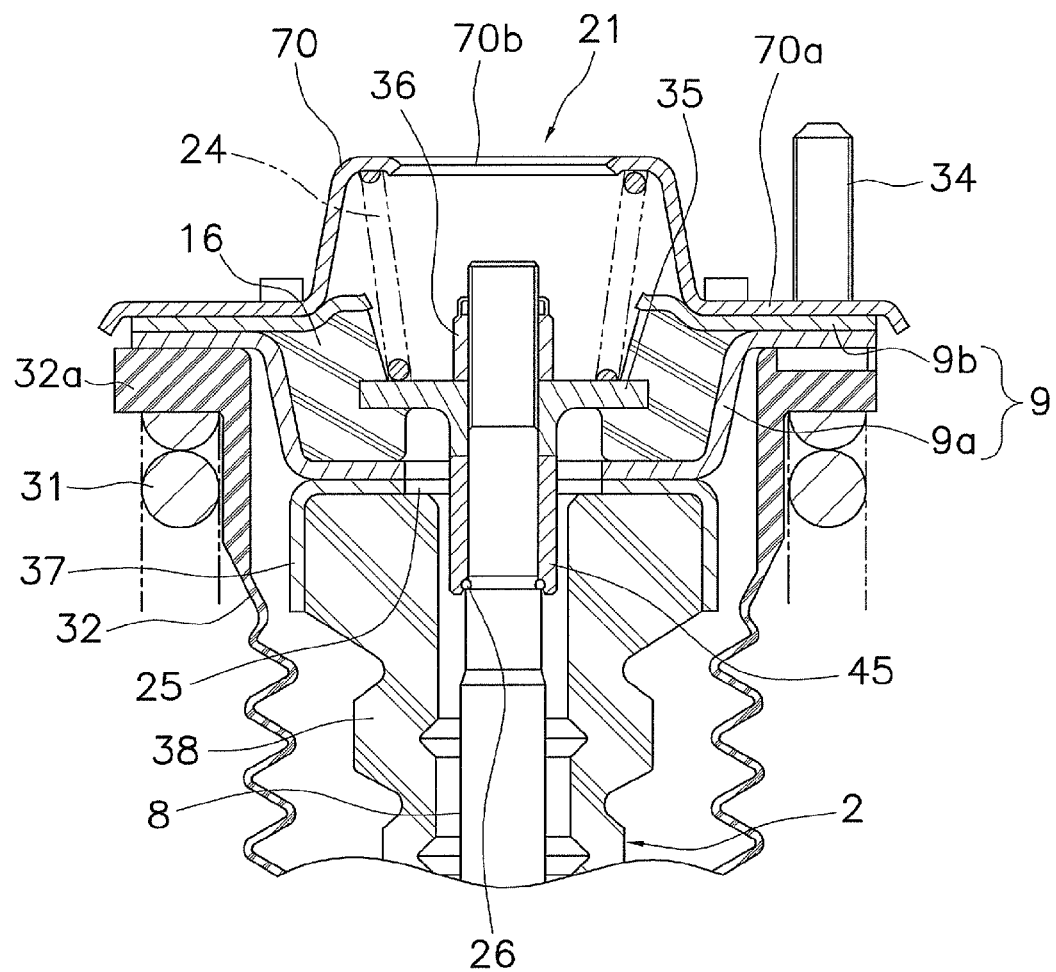
FIG. 12 is a sectional view showing another preferred embodiment of the automobile hydraulic shock absorber.

The pressure-applying mechanism can be configured as shown in FIG. 12. In FIG. 12, the same reference numerals are used to refer to members that are the same as or equivalent to those described in FIGS. 1 and 2, and no detailed description of such members will be given.

The pressure-applying mechanism 21 according to the present preferred embodiment is provided above the upper support 9 (on the opposite side of the shock absorber connecting portion (upper support 9) from the cylinder body 5). The pressure-applying mechanism 21 includes a supporting bracket 70 and the compression coil spring 24. The supporting bracket 70 has a generally cylindrical shape, and has a flange portion 70a. The flange portion 70a is fixed to the top surface of the upper plate 9b by the fixing bolt 34. In other words, the flange portion 70a is fixed between the vehicle body and the top surface of the upper plate 9b. A hole 70b is also formed in the top surface portion of the supporting bracket 70. The hole 70b is disposed so as to face the top end portion of the piston rod 8.

The compression coil spring 24 is disposed between the connecting member 35 and the supporting bracket 70. Specifically, the bottom end portion of the compression coil spring 24 is in contact with the top surface of the connecting member 35. The top end portion of the compression coil spring 24 is in contact with the inside surface of the top surface portion of the supporting bracket 70. The compression coil spring 24 is also positioned on the same axis as the piston rod 8. The compression coil spring 24 has a tapered shape such that the outside diameter of the compression coil spring 24 decreases toward the bottom. The compression coil spring 24 has a spring force capable of cancelling out the gas reactive force exerted on the piston 3. In other words, in the present preferred embodiment as well, the pressure-applying mechanism 21 pushes the piston rod 8 downward in a state in which upward movement of the pressure-applying mechanism 21 is restricted by the upper support 9.

Even when formed as shown in FIG. 12, the hydraulic shock absorber 1 produces the same effects as the hydraulic shock absorber 1 shown in FIGS. 1 and 2. Since the pressure-applying mechanism 21 is provided above the upper support 9 (on the opposite side from the cylinder body 5) in the same manner as in the hydraulic shock absorber 1 shown in FIGS. 3A and 3B, the pressure-applying mechanism 21 can easily be installed on the piston rod 8.

In the first through ninth preferred embodiments described above, examples were described in which the pushing force of the pressure-applying mechanism 21 is preferably equal in size to the gas reactive force. However, the size of the pushing force of the pressure-applying mechanism 21 may be smaller than the gas reactive force. In a case in which the compression coil spring 24 is used as the source for generating the pushing force so as to reduce the pushing force of the pressure-applying mechanism 21, a compression coil spring 24 having a relatively small spring force is preferably used. In a case in which oil pressure is used as the source for generating the pushing force, the surface area of the pressure-receiving surface of the pushing hydraulic cylinder 71 is reduced.

Even in a case in which the pushing force of the pressure-applying mechanism 21 is made smaller than the gas reactive force, the gas reactive force exerted on the piston 3 is reduced, and the rubber cushion 16 is maintained in a state in which elastic deformation thereof is possible. Consequently, although the effects are reduced in this case in comparison with a case in which the pushing force of the pressure-applying mechanism 21 is made equal in size to the gas reactive force, the vehicle ride quality can be improved.

In the first through ninth preferred embodiments described above, the pushing force of the pressure-applying mechanism 21 can be made larger than the gas reactive force described above. To achieve this pushing force in a case in which the compression coil spring 24 is used as the source for generating the pushing force, a compression coil spring 24 having a relatively large spring force is used. In a case in which oil pressure is used as the source for generating the pushing force, the surface area of the pressure-receiving surfaces of each of the pushing hydraulic cylinders 51, 71 is increased.

Figure 13A:
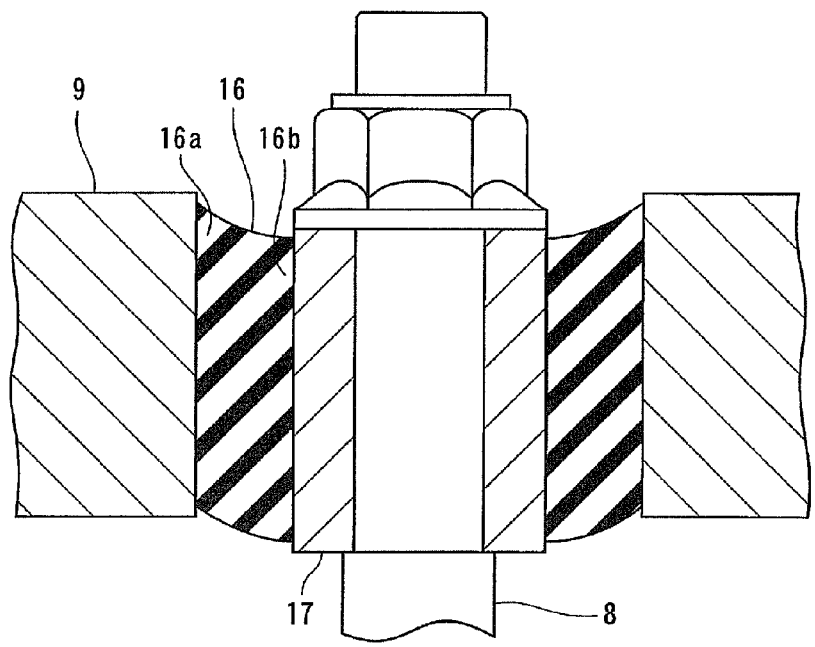
Figure 13B:
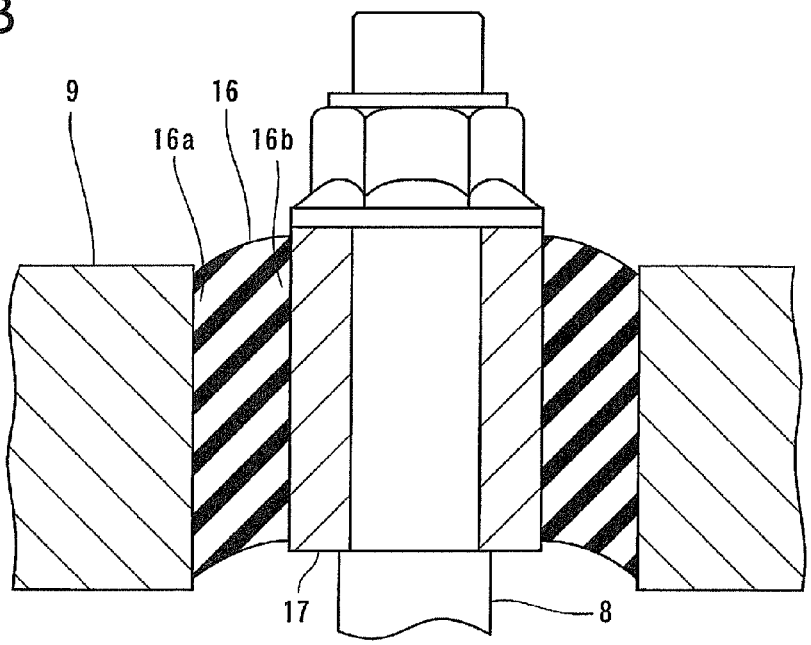

In a case in which the pushing force of the pressure-applying mechanism 21 is larger than the gas reactive force, not only is the gas reactive force for raising the piston 3 eliminated, but the piston 3 is also pushed toward the free piston 12. In other words, the piston rod 8 is pushed downward by the pushing force of the pressure-applying mechanism 21. The rubber cushion 16 between the piston rod 8 and the upper support 9 is also elastically deformed so that an external peripheral portion 16a thereof is higher than an internal peripheral portion 16b thereof, as shown in FIG. 13A. The pressure-applying mechanism 21 is omitted in FIGS. 13A and 13B.

In this case, shocks that occur when the vehicle wheel rolls over small bumps on the road are dampened by the elastic deformation of the rubber cushion 16 in the opposite direction from that described above, as shown in FIG. 13B.

The bottom end portion of the cylinder body 5 in the preferred embodiments described above corresponds to the first end portion as one end portion in the axial direction of the cylinder body of the present invention. The top end portion of the cylinder body 5 in the preferred embodiments described above corresponds to the second end portion as the other end portion in the axial direction of the cylinder body of the present invention. However, as an opposite configuration, the top end portion of the cylinder body 5 in the preferred embodiments may correspond to the first end portion of the cylinder body of the present invention, and the bottom end portion of the cylinder body 5 in the preferred embodiments may correspond to the second end portion of the present invention. In other words, the hydraulic shock absorber 1 of the present invention can be used in the same manner as in the preferred embodiments described above even in a state in which the distal end portion of the piston rod 8 is connected to the vehicle wheel, and the cylinder body 5 is connected to the vehicle body.

In each of the preferred embodiments described above, the diaphragm 4 of the hydraulic cylinder 2 is provided to the piston 3. However, the diaphragm 4 may be of any configuration in the hydraulic shock absorber according to various preferred embodiments of the present invention. For example, a communicating passage arranged to communicate the first and second oil chambers 6, 7 may be provided outside the cylinder body 5, and the diaphragm may be provided to the communicating passage.

In each of the preferred embodiments described above, the volume adjustment mechanism 11 of the hydraulic cylinder 2 is preferably configured using the free piston 12 inside the cylinder body 5. However, the volume adjustment mechanism used in the hydraulic shock absorber according to a preferred embodiment of the present invention may be of any configuration. Although not shown in the drawings, a volume adjustment mechanism that uses a reserve tank connected to the first oil chamber 6 by a communicating passage, or a publicly known twin-tube volume adjustment mechanism may be used.

The inside of the reserved tank described above is partitioned by the free piston into a high-pressure gas chamber and an oil chamber which is filled with operating oil. The oil chamber is communicated with the first oil chamber 6 or second oil chamber 7 inside the cylinder body 5 via a communicating passage. High-pressure gas is charged into the high-pressure gas chamber. In other words, the operating oil inside the cylinder body 5 is pushed by the pressure of the high-pressure gas in this configuration as well.

In a twin-tube volume adjustment mechanism, the cylinder body 5 has a double structure including an inner tube and an outer tube. The first oil chamber 6 and second oil chamber in the inner tube are communicated with a third oil chamber of the outer tube. The inside of the outer tube is also configured so that the operating oil inside the oil chambers is pressurized by high-pressure gas.

Preferred embodiments of the present invention provide an automobile hydraulic shock absorber having a small overall length and light weight despite having a structure whereby the gas reactive force exerted on the piston can be always reduced, and whereby the damping force can easily be set to a suitable value.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An automobile hydraulic shock absorber comprising:
  a cylinder body including a first end portion defining one end portion in an axial direction, and a second end portion defining another end portion in the axial direction, the first end portion being connected to one of a vehicle body and a vehicle wheel;
  a piston arranged to divide an inside of the cylinder body into a first oil chamber on a side of the first end portion and a second oil chamber on a side of the second end portion;
  a shock absorber connecting portion connected to the other of the vehicle body and the vehicle wheel;
  a piston rod attached to the shock absorber connecting portion via a damping member, the piston rod passing through the second end portion of the cylinder body from the piston and protruding to an outside of the cylinder body;
  a volume adjustment mechanism arranged to push on operating oil using pressure of a high-pressure gas, thereby canceling out an excess and a deficiency of the operating oil corresponding to an increase or a decrease in volume of the piston rod during movement of the piston;

a communicating passage arranged to communicate the first oil chamber and the second oil chamber via a diaphragm; and a pressure-applying mechanism including a compression coil spring having a first end and a second end, the first end being connected to the piston rod such that the compression coil spring pushes the piston rod toward the first end portion of the cylinder body with a pushing force, the pressure-applying mechanism being disposed outside the cylinder body, and movement of the second end of the pressure-applying mechanism being restricted by the shock absorber connecting portion.

2. The automobile hydraulic shock absorber according to claim 1, wherein an amount of the pushing force applied by the pressure-applying mechanism is equal to a gas reactive force to push the piston toward the second end portion of the cylinder body with a strength corresponding to a difference in surface area between one pressure-receiving surface of the piston and another pressure-receiving surface thereof.

3. The automobile hydraulic shock absorber according to claim 1, wherein an amount of the pushing force of the pressure-applying mechanism is smaller than a gas reactive force to push the piston toward the second end portion of the cylinder body with a strength corresponding to a difference in surface area between one pressure-receiving surface of the piston and another pressure-receiving surface thereof.

4. The automobile hydraulic shock absorber according to claim 1, wherein an amount of the pushing force of the pressure-applying mechanism is larger than a gas reactive force to push the piston toward the second end portion of the cylinder body with a strength corresponding to a difference in surface area between one pressure-receiving surface of the piston and another pressure-receiving surface thereof.

5. The automobile hydraulic shock absorber according to claim 1, wherein
   the first end portion of the cylinder body is connected to the vehicle wheel;
   the shock absorber connecting portion is connected to the vehicle body; and
   the pressure-applying mechanism is provided between the shock absorber connecting portion and the cylinder body.

6. The automobile hydraulic shock absorber according to claim 1, wherein
   the first end portion of the cylinder body is connected to the vehicle wheel;
   the shock absorber connecting portion is connected to the vehicle body; and
   the pressure-applying mechanism is provided across from the cylinder body, with the shock absorber connecting portion in between.

7. The automobile hydraulic shock absorber according to claim 1, wherein the compression coil spring is positioned on a same axis as the piston rod.

8. The automobile hydraulic shock absorber according to claim 7, further comprising:
   a pushing force adjustment mechanism including a screw portion extending in a direction parallel or substantially parallel to the piston rod; and a support portion that is caused to move in the axial direction of the piston rod by rotation of the screw portion; wherein
   one of the first and second end of the compression coil spring is supported by the shock absorber connecting portion via the pushing force adjustment mechanism.

9. The automobile hydraulic shock absorber according to claim 1, wherein the pushing force by the compression coil spring is not affected by a stroke position of the piston rod.

* * * * *